(12) United States Patent
Xia et al.

(10) Patent No.: US 12,375,783 B2
(45) Date of Patent: Jul. 29, 2025

(54) CAMERA MODULE, ASSEMBLY METHOD THEREFOR, AND ELECTRONIC DEVICE

(71) Applicant: HONOR DEVICE CO., LTD., Shenzhen (CN)

(72) Inventors: Taihong Xia, Shenzhen (CN); Chao Chen, Shenzhen (CN); Yanghua Yu, Shenzhen (CN); Shuai Yuan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 141 days.

(21) Appl. No.: 18/274,564

(22) PCT Filed: Feb. 18, 2022

(86) PCT No.: PCT/CN2022/076736
§ 371 (c)(1),
(2) Date: Jul. 27, 2023

(87) PCT Pub. No.: WO2022/193900
PCT Pub. Date: Sep. 22, 2022

(65) Prior Publication Data
US 2024/0098350 A1    Mar. 21, 2024

(30) Foreign Application Priority Data

Mar. 19, 2021   (CN) .......................... 202110295108.8
May 31, 2021   (CN) .......................... 202110603417.7

(51) Int. Cl.
*H04N 23/51*   (2023.01)
*H04N 23/54*   (2023.01)
(Continued)

(52) U.S. Cl.
CPC ............. *H04N 23/51* (2023.01); *H04N 23/54* (2023.01); *H04N 23/55* (2023.01); *H04N 23/57* (2023.01)

(58) Field of Classification Search
CPC ........ H04N 23/51; H04N 23/54; H04N 23/55; H04N 23/57
See application file for complete search history.

(56) References Cited

U.S. PATENT DOCUMENTS

| 10,935,809 B2 | 3/2021 | Hu et al. |
| 2007/0025710 A1* | 2/2007 | Shin ....................... H04N 23/68 348/E5.046 |

(Continued)

FOREIGN PATENT DOCUMENTS

| CN | 105573014 A | 5/2016 |
| CN | 106572284 A | 4/2017 |

(Continued)

*Primary Examiner* — Amy R Hsu
(74) *Attorney, Agent, or Firm* — WOMBLE BOND DICKINSON (US) LLP

(57) ABSTRACT

This application provides a camera module, an assembly method therefor, and an electronic device. In the camera module, a fastening bracket is disposed in a casing, the fastening bracket includes a first fastening part and a second fastening part, the first fastening part is sleeved outside a lens assembly, one end of the second fastening part is connected to a side surface that is of the first fastening part and that faces the bottom of the casing, the other end of the second fastening part is supported on the bottom of the casing, at least one magnetic component is fastened to an inner edge of the first fastening part, one part of the magnetic component faces a first driving component, the other part of the magnetic component faces a second driving component.

20 Claims, 12 Drawing Sheets

(51) Int. Cl.
    *H04N 23/55*     (2023.01)
    *H04N 23/57*     (2023.01)

(56) References Cited

U.S. PATENT DOCUMENTS

| | | |
|---|---|---|
| 2013/0215511 A1 | 8/2013 | Wu et al. |
| 2018/0284566 A1* | 10/2018 | Minamisawa ......... H04N 23/54 |
| 2018/0367714 A1* | 12/2018 | Im ..................... H04N 23/687 |
| 2019/0028622 A1 | 1/2019 | Hu et al. |
| 2019/0394401 A1* | 12/2019 | Hu ..................... G02B 27/646 |
| 2020/0033555 A1 | 1/2020 | Kuo et al. |
| 2020/0137274 A1* | 4/2020 | Lee ..................... G03B 17/17 |
| 2022/0390813 A1 | 12/2022 | Lee et al. |
| 2023/0008053 A1 | 1/2023 | Tang et al. |
| 2023/0036225 A1 | 2/2023 | Pang |
| 2023/0194960 A1* | 6/2023 | Yedid ................... G03B 30/00 |
| 2024/0061317 A1* | 2/2024 | You ...................... G03B 3/10 |

FOREIGN PATENT DOCUMENTS

| | | |
|---|---|---|
| CN | 107277307 A | 10/2017 |
| CN | 108322632 A | 7/2018 |
| CN | 111147708 A | 5/2020 |
| CN | 111510598 A | 8/2020 |
| CN | 111698352 A | 9/2020 |
| CN | 111917965 A | 11/2020 |
| CN | 212115444 U | 12/2020 |
| CN | 212163453 U | 12/2020 |
| CN | 212183604 U | 12/2020 |
| CN | 112291450 A | 1/2021 |

* cited by examiner

CAMERA MODULE, ASSEMBLY METHOD THEREFOR, AND ELECTRONIC DEVICE

CROSS-REFERENCE TO RELATED APPLICATIONS

This application is a national stage of International Application No. PCT/CN2022/076736, filed on Feb. 18, 2022, which claims priority to Chinese Patent Application No. 202110295108.8, filed on Mar. 19, 2021, and Chinese Patent Application No. 202110603417.7, filed on May 31, 2021. The disclosures of each of the aforementioned applications are hereby incorporated by reference in their entireties.

TECHNICAL FIELD

This application relates to the field of mobile terminal technologies, and in particular, to a camera module, an assembly method therefor, and an electronic device.

BACKGROUND

In life, people often use electronic devices (such as smartphones and tablet computers) for photographing. Quality of photos taken by the electronic devices has become one of important criteria for measuring performance of the terminal devices.

When performing photographing by using a portable electronic device (such as a mobile phone), a user usually performs photographing in a handheld manner. Therefore, there is often a problem that a captured image is blurred due to hand shake. To resolve the problem, some electronic devices have an optical image stabilization function. A movement amount of hand shake is offset by moving a lens assembly or an image sensor of a camera module, to improve quality of a captured image.

However, a current mainstream camera module has many parts and a complex assembly process, and it is difficult to test performance.

SUMMARY

This application provides a camera module, an assembly method therefor, and an electronic device, so that the camera module has a simple structure, is easy to assemble, and has high reliability.

According to a first aspect, this application provides a camera module, including a casing, a fastening bracket, a lens assembly, a first driving component, a second driving component, and an image sensor component, where a mounting hole is disposed on one side surface of the casing, the lens assembly is partially accommodated in the casing by using the mounting hole, the fastening bracket is disposed in the casing, the image sensor component is located at the bottom of the casing, the fastening bracket includes a first fastening part and a second fastening part, the first fastening part is sleeved outside the lens assembly, one end of the second fastening part is connected to a side that is of the first fastening part and that faces the bottom of the casing, the other end of the second fastening part is supported on an inner bottom wall of the casing, and at least one magnetic component is fastened to an inner edge of the first fastening part; and the first driving component is located on the side that is of the first fastening part and that faces the bottom of the casing, one side surface of the first driving component faces one part of the magnetic component, the other side surface of the first driving component is connected to the image sensor component, the magnetic component is configured to drive the first driving component to move, the second driving component is sleeved on an outer wall of the lens assembly, the second driving component faces the other part of the magnetic component, and the magnetic component is configured to drive the second driving component to move.

In the camera module provided in this application, the fastening bracket is disposed in the casing, the fastening bracket includes the first fastening part and the second fastening part, the first fastening part is sleeved outside the lens assembly, one end of the second fastening part is connected to the side that is of the first fastening part and that faces the bottom of the casing, the other end of the second fastening part is supported on the bottom of the casing, the magnetic component is disposed on the inner edge of the first fastening part, a part that is of the magnetic component and that faces the first driving component is configured to drive the first driving component to move, a part that is of the magnetic component and that faces the second driving component is configured to drive the second driving component to move, and the image sensor component and the lens assembly are respectively driven to move by using the first driving component and the second driving component. The first driving component and the second driving component are driven by using the magnetic component disposed on the fastening bracket. Therefore, a structure of the camera module is simplified, an assembly process of the camera module is simple, and it is easy to test performance of the camera module, thereby improving reliability of the camera module.

In a possible implementation, the second fastening part includes a plurality of support parts disposed at intervals, and the first driving component and the image sensor component are located in space enclosed by the plurality of support parts.

In a possible implementation, at least two magnetic components are fastened to the inner edge of the first fastening part, and the two magnetic components are respectively disposed on two opposite sides of the first fastening part.

At least two opposite magnetic components are disposed, and the first driving component and the second driving component are driven to move by using the magnetic components on two sides, so that movement of the image sensor component and the lens assembly is smoother.

In a possible implementation, the magnetic component includes a first magnetic member and a second magnetic member, the first magnetic member faces the first driving component and drives the first driving component to move, and the second magnetic member faces the second driving component and drives the second driving component to move.

The first magnetic member and the second magnetic member are disposed, so that the first driving component is driven to move by using a magnetic force generated between the first magnetic member and the first driving component, and the second driving component is driven to move by using a magnetic force generated between the second magnetic member and the second driving component.

In a possible implementation, the magnetic component further includes a magnetoconductive member fastened to the first fastening part, the magnetoconductive member includes a first magnetoconductive part and a second magnetoconductive part, the first magnetoconductive part faces the first driving component, a surface of the first magnetic member is attached to a surface of the first magnetoconductive part, the second magnetoconductive part faces the second driving component, and a surface of the second magnetic member is attached to a surface of the second magnetoconductive part; and the first magnetoconductive part and the second magnetoconductive part have opposite magnetism, the first magnetic member and the first magnetoconductive part have opposite magnetism, and the second magnetic member and the second magnetoconductive part have opposite magnetism.

The first magnetic member and the second magnetic member are fastened to the first fastening part by using the magnetoconductive member. The first magnetic member is fastened by using the first magnetoconductive part of the magnetoconductive member, and the first magnetoconductive part absorbs the first magnetic member to the surface of the first magnetoconductive part by using a magnetic attraction force between the first magnetoconductive part and the first magnetic member. The second magnetic member is fastened by using the second magnetoconductive part of the magnetoconductive member, and the second magnetoconductive part absorbs the second magnetic member to the surface of the second magnetoconductive part by using a magnetic attraction force between the second magnetoconductive part and the second magnetic member.

In a possible implementation, the first driving component includes a support plate and at least one first driving coil, the first driving coil is disposed on a side surface that is of the support plate and that faces the magnetic component, and the first driving coil is opposite to the magnetic component.

The support plate is disposed to fasten the first driving coil, a magnetic force is generated between the first driving coil and the magnetic component by enabling the first driving coil to face the magnetic component, and a magnitude and a direction of a current in the first driving coil are adjusted to change a magnitude and a direction of the magnetic force between the first driving coil and the magnetic component, thereby implementing movement of the first driving component.

In a possible implementation, at least one first limiting part is disposed on the first fastening part, at least one second limiting part is disposed on a side that is of the support plate and that faces the first fastening part, the second limiting part is opposite to the first limiting part, a ball is disposed between the first limiting part and the second limiting part, and the first limiting part and the second limiting part are in contact with each other by using the ball.

The first limiting part is disposed on the first fastening part, the second limiting part opposite to the first limiting part is disposed on the support plate, and the ball is disposed between the first limiting part and the second limiting part, so that the first fastening part and the support plate are in contact with each other through rolling, thereby reducing resistance to movement of the support plate.

In a possible implementation, at least two first limiting parts are disposed on the first fastening part, the two first limiting parts are opposite, at least two second limiting parts are disposed on the support plate, and each second limiting part corresponds to each first limiting part.

In a possible implementation, a limiting recess is disposed on one of the first limiting part and the second limiting part, and the ball moves within the limiting recess.

The limiting recess is disposed on the first limiting part or the second limiting part, so that the ball is limited within the limiting recess, to prevent the ball from falling off between the first limiting part and the second limiting part, and ensure stable contact between the support plate and the first fastening part.

In a possible implementation, there is a gap between the first limiting part and the second limiting part.

A diameter of the ball is greater than a depth of the limiting recess, so that a gap is reserved between the first limiting part and the second limiting part, to avoid contact between the first limiting part and the second limiting part, and prevent the first limiting part from impeding movement of the support plate.

In a possible implementation, the support plate is a magnetoconductive plate.

The support plate faces the first magnetic member on the first fastening part, and the support plate is made magnetic, so that a magnetic attraction force is generated between the first magnetic member and the support plate. This can ensure that the first driving component is always in contact with the first fastening part, and prevent the first driving component from loosening.

In a possible implementation, the second driving component includes a support base and a second driving coil, the support base is sleeved on the outer wall of the lens assembly, and the second driving coil is sleeved on an outer wall of the support base.

A magnetic force is generated between the second driving coil and the second magnetic member, the second driving coil is driven to move by changing a magnitude and a direction of a current in the second driving coil, and the second driving coil is fastened to the outer wall of the lens assembly by using the support base, so that the second driving coil drives the lens assembly to move.

In a possible implementation, the image sensor component includes an image sensor, there is a gap between a heat dissipation surface of the image sensor and the inner bottom wall of the casing, and the gap is filled with thermally conductive liquid.

The gap between the image sensor and the inner bottom wall of the casing is filled with the thermally conductive liquid, the heat dissipation surface of the image sensor is in contact with the thermally conductive liquid, and heat dissipation is performed on the image sensor by using thermal conduction action of the thermally conductive liquid, to improve heat dissipation efficiency of the image sensor.

In a possible implementation, an annular sealing plate is affixed to the inner bottom wall of the casing, and the thermally conductive liquid is located in an area enclosed by the annular sealing plate.

The thermally conductive liquid is sealed by using the annular sealing plate, to limit a coverage area of the thermally conductive liquid, so that an area in which the thermally conductive liquid is located corresponds to the heat dissipation surface of the image sensor.

In a possible implementation, there is a gap between the annular sealing plate and the image sensor.

The thermally conductive liquid expands by absorbing heat from the image sensor, and the thermally conductive liquid spills out. A gap is reserved between a surface of the annular sealing plate and the image sensor, and the gap may accommodate the spilled thermally conductive liquid, to reserve specific flow space for the thermally conductive liquid.

In a possible implementation, a plurality of sealing holes are disposed at intervals on the annular sealing plate, or a surface of the annular sealing plate is an uneven corrugated surface.

The spilled thermally conductive liquid is stored by using the sealing hole on the annular sealing plate. In addition, due to surface tension action of the thermally conductive liquid in the gap between the annular sealing plate and the image sensor, the thermally conductive liquid is prevented from spilling out of the annular sealing plate. The spilled thermally conductive liquid is stored by using a recessed area on the corrugated surface of the annular sealing plate. In addition, due to surface tension action of the thermally conductive liquid in a gap between the top of a raised area of the corrugated surface and the image sensor, the thermally conductive liquid is prevented from spilling out of the annular sealing plate.

In a possible implementation, a plurality of strip-shaped grooves are disposed at intervals on the annular sealing plate, and the strip-shaped grooves extend in a direction of a contour line of the annular sealing plate; and a plurality of rows of strip-shaped grooves are disposed from an inner edge to an outer edge of the annular sealing plate, and strip-shaped grooves in different rows are staggered.

A plurality of strip-shaped grooves extending in the direction of the contour line of the sealing plate are disposed at intervals on the sealing plate, so that the strip-shaped grooves can store the spilled thermally conductive liquid, to prevent the thermally conductive liquid from spilling out of the annular sealing plate. In addition, the strip-shaped grooves disposed at intervals have small impact on strength of the annular sealing plate. Moreover, strip-shaped grooves in different rows are staggered, so that the thermally conductive liquid can be prevented from continuing to spill out by crossing the strip-shaped grooves.

In a possible implementation, the image sensor component further includes a flexible electrical connecting piece, one end of the flexible electrical connecting piece is connected to the image sensor, and the other end of the flexible electrical connecting piece is configured to be connected to an external circuit.

In a possible implementation, the flexible electrical connecting piece includes a connecting part, a movable cantilever, and a fastening part, the connecting part is connected to the image sensor, the fastening part is connected to the external circuit, and the movable cantilever is located between the connecting part and the fastening part; and the movable cantilever surrounds the image sensor at least half a circle.

The movable cantilever is disposed, so that the image sensor moves to drive the movable cantilever to deform and move, to prevent the flexible electrical connecting piece from limiting displacement of the image sensor. The movable cantilever surrounds the image sensor at least half a circle, the movable cantilever includes at least two parts extending in different directions, and the movable cantilever can ensure that the image sensor moves in any direction in a plane in which the image sensor is located.

According to a second aspect, this application provides an assembly method for a camera module, where the assembly method is used to assemble the camera module according to any one of the foregoing implementations, and the assembly method includes:

providing a lens assembly, and sleeving a second driving component on an outer wall of the lens assembly;

providing a fastening bracket, where the fastening bracket includes a first fastening part and a second fastening part, and the second fastening part is connected to a bottom surface of the first fastening part;

fastening at least one magnetic component to an inner edge of the first fastening part;

sleeving, outside the lens assembly, the fastening bracket to which the magnetic component is fastened, where the second driving component faces one part of the magnetic component;

providing a first driving component, and connecting one side surface of the first driving component to the fastening bracket, where the first driving component faces the other part of the magnetic component;

providing an image sensor component, and fastening the image sensor component to the other side surface of the first driving component; and sleeving a casing outside the fastening bracket.

According to a third aspect, this application provides an electronic device, including at least one camera module according to any one of the foregoing implementations.

The electronic device provided in this application includes at least one camera module. In the camera module, the fastening bracket is disposed in the casing, the fastening bracket includes the first fastening part and the second fastening part, the first fastening part is sleeved outside the lens assembly, one end of the second fastening part is connected to the side that is of the first fastening part and that faces the bottom of the casing, the other end of the second fastening part is supported on the bottom of the casing, the magnetic component is disposed on the inner edge of the first fastening part, a part that is of the magnetic component and that faces the first driving component is configured to drive the first driving component to move, a part that is of the magnetic component and that faces the second driving component is configured to drive the second driving component to move, and the image sensor component and the lens assembly are respectively driven to move by using the first driving component and the second driving component. The first driving component and the second driving component are driven by using the magnetic component disposed on the fastening bracket. Therefore, a structure of the camera module is simplified, an assembly process of the camera module is simple, and it is easy to test performance of the camera module, thereby improving reliability of the camera module.

DESCRIPTIONS OF REFERENCE NUMERALS

100—electronic device;
1—camera module; 2—housing; 21—rear cover; 211—light-transmitting hole; 22—middle frame; 3—display panel; 4—circuit board;
11—casing; 12—fastening bracket; 13—lens assembly; 14—first driving component; 15—second driving component; 16—image sensor component; 17—magnetic component; 18—thermally conductive liquid; 19—annular sealing plate;
111—outer frame; 112—bottom plate; 121—first fastening part; 122—second fastening part; 123—positioning plate; 141—support plate; 142—first driving coil; 151—support base; 152—second driving coil; 161—image sensor; 162—flexible electrical connecting piece; 163—light-transmitting plate; 171—first magnetic member; 172—second magnetic member; 173—magnetoconductive member; 191—sealing hole; 192—strip-shaped groove;
1111—mounting hole; 1211—first limiting part; 1221—support part; 1411—second limiting part; 1421—lightening hole; 1621—connecting part; 1622—movable cantilever; 1623—mounting part; 1731—first magnetoconductive part; 1732—second magnetoconductive part; and
1211a—limiting recess; 1211b—ball.

DESCRIPTION OF EMBODIMENTS

Terms used in implementations of this application are only used to explain specific embodiments of this application, and are not intended to limit this application.

With continuous progress of science and technology, a photographing function has gradually become essential to a mobile terminal such as a mobile phone, a tablet computer, a notebook computer, a personal digital assistant (Personal Digital Assistant, PDA), a smart wearable device, or a point of sales (Point of Sales, POS).

Figure 1:
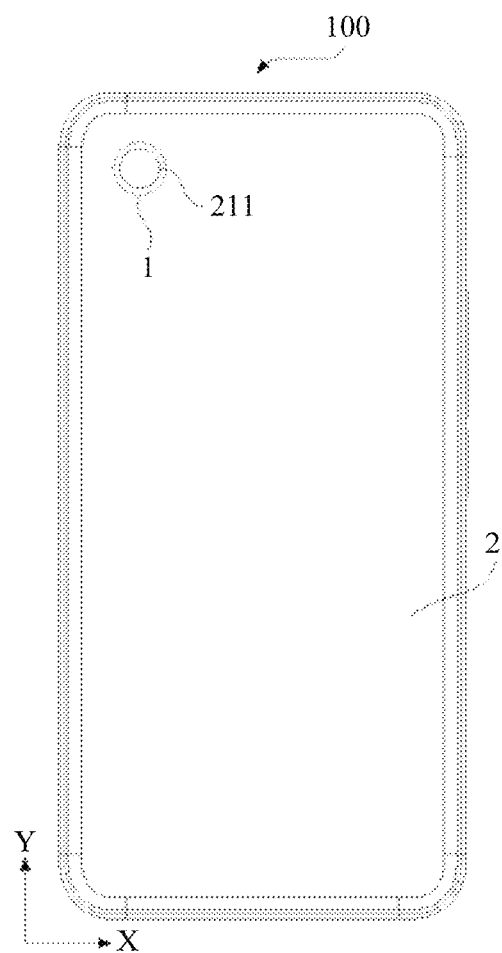
FIG. 1 is a schematic diagram of a structure of an electronic device according to an embodiment of this application.
Figure 2:
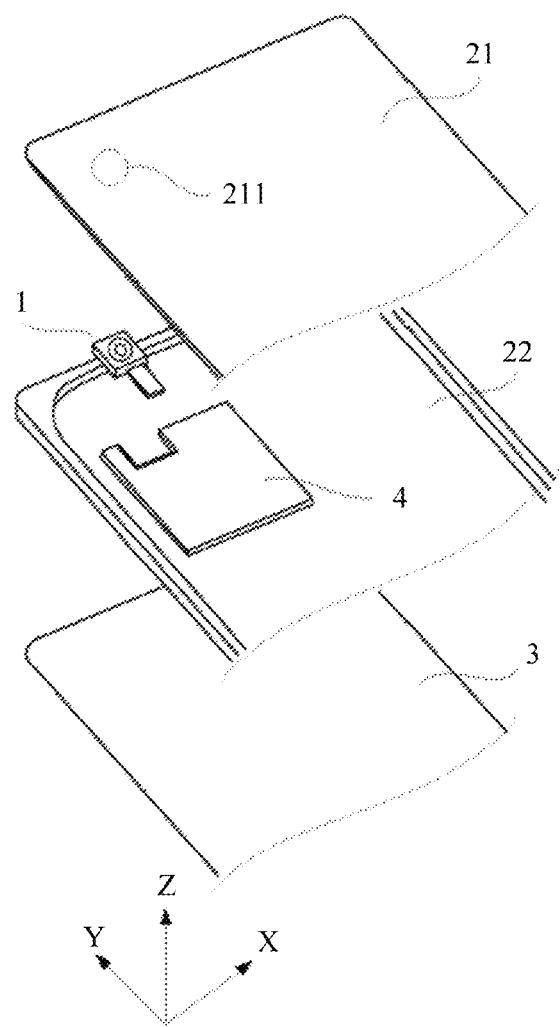
FIG. 2 is a partial exploded view of FIG. 1.

FIG. 1 is a schematic diagram of a structure of an electronic device according to an embodiment of this application. FIG. 2 is a partial exploded view of FIG. 1. As shown in FIG. 1 and FIG. 2, a mobile phone is used as an example to describe an electronic device 100 in this application. It should be understood that the electronic device 100 in this embodiment includes but is not limited to a mobile phone. The electronic device 100 may alternatively be a mobile terminal such as the tablet computer, the notebook computer, the PDA, the smart wearable device, or the POS.

As shown in FIG. 1 and FIG. 2, the electronic device 100 may include a housing 2, a display panel 3, a camera module 1, and a circuit board 4. The housing 2 surrounds the back and the side of the electronic device 100, and the display panel 3 is mounted on the housing 2. The display panel 3 and the housing 2 jointly enclose accommodating space of the electronic device 100, and both the camera module 1 and the circuit board 4 are mounted in the accommodating space. In addition, a device such as a microphone, a speaker, or a battery may be further disposed in the accommodating space.

FIG. 1 shows that the camera module 1 is located in an area at the top of the housing 2 near an edge. It may be understood that a position of the camera module 1 is not limited to the position shown in FIG. 1.

As shown in FIG. 2, in some embodiments, the housing 2 may include a back cover 21 and a middle frame 22. A light-transmitting hole 211 is disposed on the back cover 21, the camera module 1 may be disposed on the middle frame 22, and the camera module 1 collects external ambient light by using the light-transmitting hole 211 on the back cover 21. A photosensitive surface of the camera module 1 is opposite to the light-transmitting hole 211, and the external ambient light passes through the light-transmitting hole 211 and irradiates on the photosensitive surface. The photosensitive surface is used to collect the external ambient light. The camera module 1 is configured to convert an optical signal into an electrical signal to implement a photographing function thereof.

FIG. 2 shows that one camera module 1 is disposed in the electronic device 100. It should be noted that in actual application, a quantity of camera modules 1 is not limited to one, and the quantity of camera modules 1 may be two or more. When there are a plurality of camera modules 1, the plurality of camera modules 1 may be randomly disposed in an X-Y plane. For example, the plurality of camera modules 1 are disposed in an X-axis direction, or the plurality of camera modules 1 are disposed in a Y-axis direction.

In addition, the camera module 1 includes but is not limited to an autofocus (Auto Focus, AF) module, a fixed-focus (Fix Focus, FF) module, a wide-angle camera module 1, a long-focus camera module 1, a color camera module 1, or a black-and-white camera module 1. The camera module 1 in the electronic device 100 may include any one of the foregoing camera modules 1, or include two or more of the foregoing camera modules 1. When there are two or more camera modules 1, the two or more camera modules 1 may be integrated into one camera assembly.

As shown in FIG. 2, the camera module 1 may be electrically connected to the circuit board 4. The circuit board 4 is, for example, a main board in the electronic device 100. In an implementation, the camera module 1 may be electrically connected to the main board by using an electrical connector. For example, the camera module 1 is provided with a female socket of the electrical connector, the main board is provided with a male socket of the electrical connector, and the female socket is inserted into the male socket, to electrically connect the camera module 1 to the main board. For example, the main board is provided with a processor, and the processor controls the camera module 1 to photograph an image. When a user inputs a photographing instruction, the processor receives the photographing instruction, and controls, based on the photographing instruction, the camera module 1 to photograph a photographed object.

The following describes in detail the camera module 1 in the electronic device 100 in this embodiment of this application.

Figure 3:
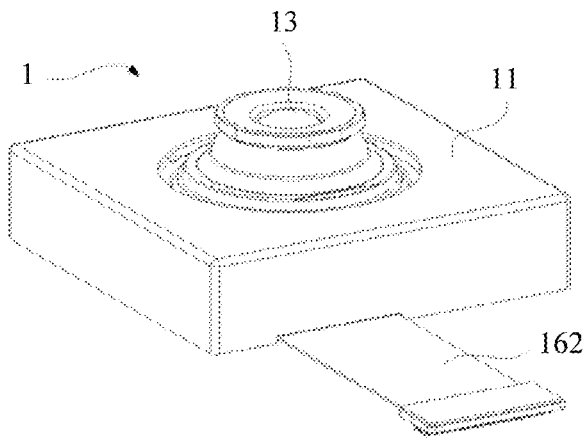
FIG. 3 is a schematic diagram of a structure of a camera module according to an embodiment of this application.
Figure 4:
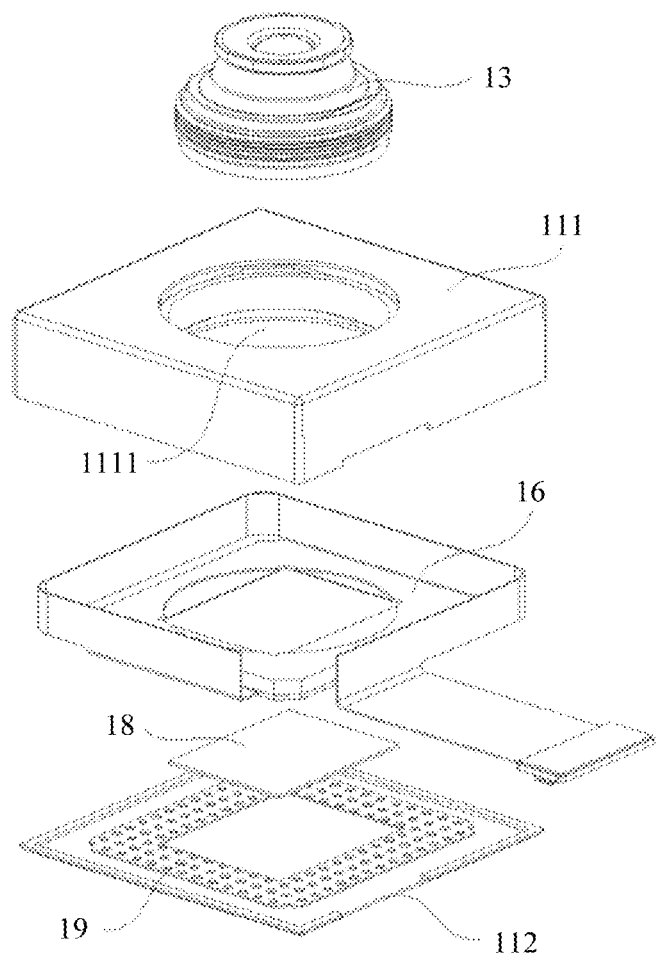
FIG. 4 is an exploded view of FIG. 3.

FIG. 3 is a schematic diagram of a structure of a camera module according to an embodiment of this application. FIG. 4 is an exploded view of FIG. 3. As shown in FIG. 3 and FIG. 4, the camera module 1 in this embodiment includes a casing 11, a lens assembly 13, and an image sensor component 16. A mounting hole 1111 is disposed on one side surface of the casing 11. An interior of the casing 11 is hollow to form accommodating space. The lens assembly 13 is mounted on the casing 11 by using the mounting hole 1111. One part of the lens assembly 13 is located in the accommodating space in the casing 11, and the other part of the lens assembly 13 is exposed outside the casing 11. The image sensor component 16 is disposed in the casing 11. For example, the image sensor component 16 is disposed at the bottom of the casing 11.

Figure 5:
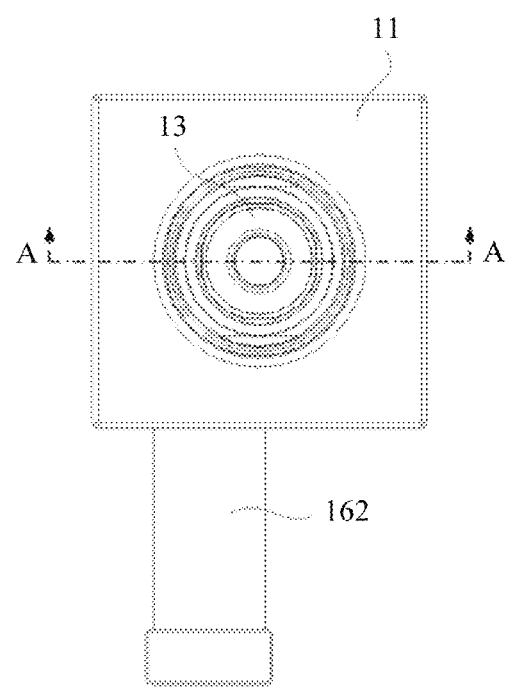
FIG. 5 is a main view of FIG. 3.
Figure 6:
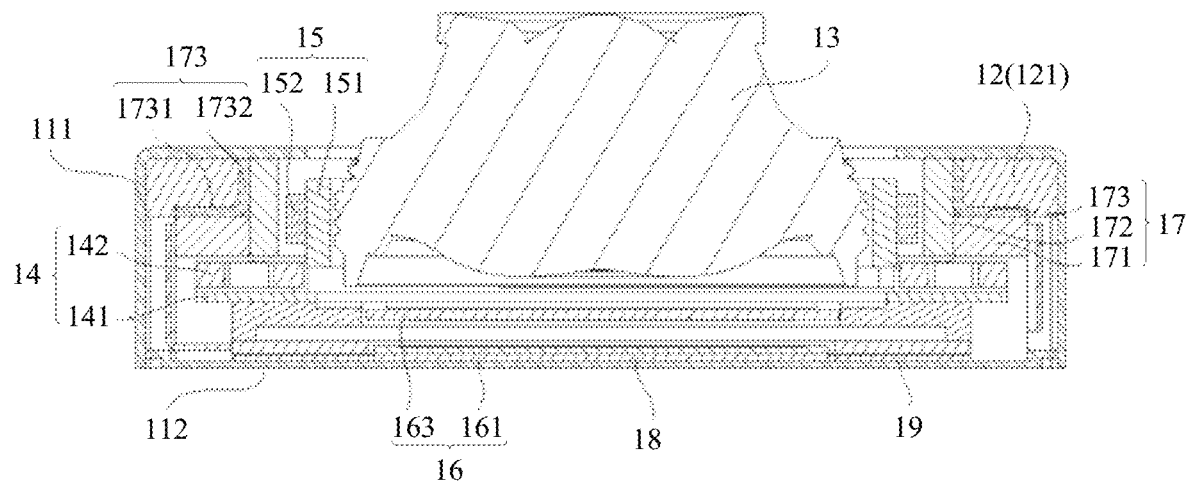
FIG. 6 is a sectional view along A-A in FIG. 5.

FIG. 5 is a main view of FIG. 3. FIG. 6 is a sectional view along A-A in FIG. 5. As shown in FIG. 6, a light entry side of the lens assembly 13 is located outside the casing 11, and a light exit side of the lens assembly 13 is located inside the casing 11. For example, the light entry side of the lens assembly 13 corresponds to the light-transmitting hole 211 on the back cover 21 of the electronic device 100. External ambient light passes through the light-transmitting hole 211, and enters the lens assembly 13 from the light entry side of the lens assembly 13. The lens assembly 13 includes, for example, one or more stacked lenses. An optical axis of the lens assembly 13 passes through the center of the lens, the lens converges incident light, and the converged light is emitted from the light exit side of the lens assembly 13.

The image sensor component 16 is located on a light exit path of the lens assembly 13. For example, the image sensor component 16 is located on the light exit side of the lens assembly 13, and the optical axis of the lens assembly 13 passes through the center of the image sensor component 16. Light emitted from the lens assembly 13 enters the image sensor component 16, and a signal of the emitted light is converted into an electrical signal by using photoelectric conversion action of the image sensor component 16, to implement an imaging function of the camera module 1.

As shown in FIG. 4, in this embodiment, the casing 11 may include an outer frame 111 and a bottom plate 112, and the outer frame 111 and the bottom plate 112 jointly enclose accommodating space of the casing 11. The detachable bottom plate 112 is disposed, to help mount the lens assembly 13, the image sensor component 16, and another device of the camera module 1 in the casing 11. The mounting hole 1111 is located on a side surface that is of the outer frame 111 and that is opposite to the bottom plate 112. The lens assembly 13 is mounted in the casing 11 through the mounting hole 1111 in a direction of the optical axis of the lens assembly 13. The image sensor component 16 is close to the bottom plate 112.

Still referring to FIG. 6, the camera module 1 in this embodiment further includes a first driving component 14 and a second driving component 15, and the first driving component 14 and the second driving component 15 are disposed in the casing 11. Specifically, the first driving component 14 is configured to drive the image sensor component 16 to move. For example, the first driving component 14 may drive the image sensor component 16 to translate or rotate in a direction perpendicular to the optical axis of the lens assembly 13 in a plane in which the image sensor component 16 is located, to implement an image stabilization function of the camera module 1. The second driving component 15 is configured to drive the lens assembly 13 to move. For example, the second driving component 15 may drive the lens assembly 13 to move in the direction of the optical axis of the lens assembly 13, to implement a focusing function of the camera module 1.

Figure 7:
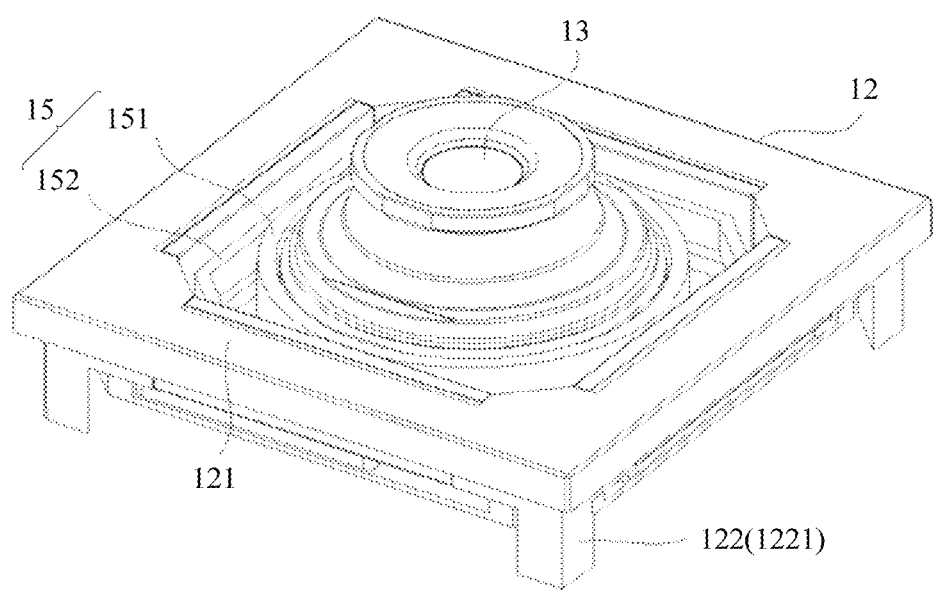
FIG. 7 is a schematic diagram of an internal structure of a camera module according to an embodiment of this application.
Figure 8:
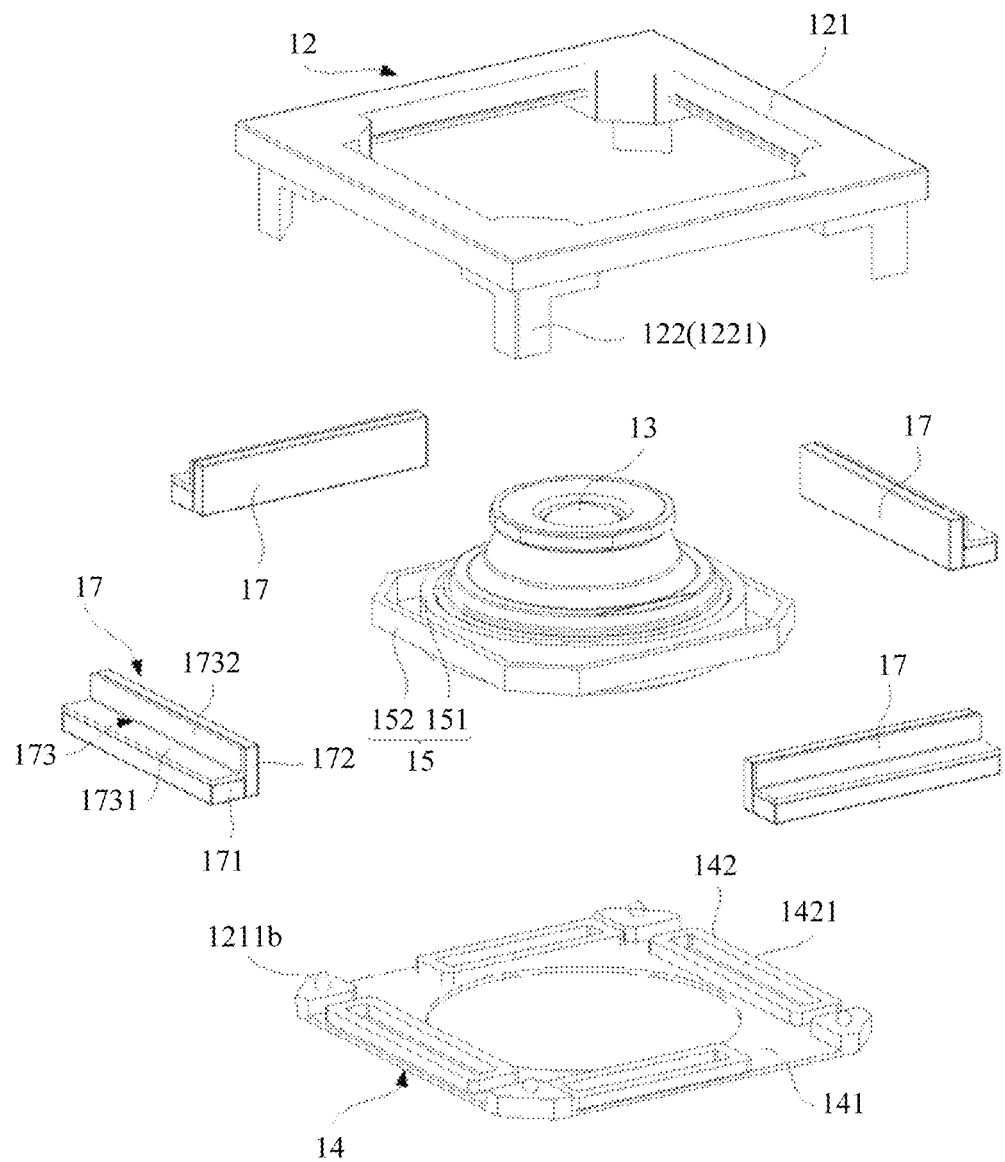
FIG. 8 is an exploded view of FIG. 7.

In the camera module 1 in this embodiment, a fastening bracket 12 is further disposed in the casing 11, and the first driving component 14 and the second driving component 15 are movably mounted in the casing 11 by using the fastening bracket 12. FIG. 7 is a schematic diagram of an internal structure of a camera module according to an embodiment of this application. FIG. 8 is an exploded view of FIG. 7. As shown in FIG. 7 and FIG. 8, the fastening bracket 12 is sleeved outside the lens assembly 13. The fastening bracket 12 includes a first fastening part 121 and a second fastening part 122. One end of the second fastening part 122 is connected to a side that is of the first fastening part 121 and that faces the bottom of the casing 11, and the other end of the second fastening part 122 is supported on an inner bottom wall of the casing 11.

The first fastening part 121 is, for example, an annular part surrounding an outer side of the lens assembly 13. At least one magnetic component 17 is fastened to an inner edge that is of the first fastening part 121 and that is close to an outer side wall of the lens assembly 13. The magnetic component 17 is configured to drive the first driving component 14 and the second driving component 15 to move.

Specifically, as shown in FIG. 6, the first driving component 14 is located on the side that is of the first fastening part 121 and that faces the bottom of the casing 11, and one side surface of the first driving component 14 faces one part of the magnetic component 17. For example, one part of the magnetic component 17 faces the bottom plate 112 of the casing 11, and the first driving component 14 faces the part of the magnetic component 17. The other side surface of the first driving component 14 is connected to the image sensor component 16. The first driving component 14 may generate a magnetic field, and a magnetic force may be generated between the first driving component 14 and the magnetic component 17. The first driving component 14 may be driven to move by changing the magnetic force between the first driving component 14 and the magnetic component 17.

The first driving component 14 and the magnetic component 17 may be disposed in the direction of the optical axis of the lens assembly 13. A plate surface of the first driving component 14 is perpendicular to the direction of the optical axis of the lens assembly 13. The first driving component 14 is driven to move in the direction perpendicular to the optical axis of the lens assembly 13 by changing a magnitude of the magnetic force between the first driving component 14 and the magnetic component 17. For example, the first driving component 14 translates or rotates in a plane in which the first driving component 14 is located, to drive the image sensor component 16 to translate or rotate, compensate for a displacement amount caused by hand shake of the user, prevent a captured image from being blurred, improve image definition, and improve quality of the image captured by the camera module 1.

The second driving component 15 is sleeved outside the lens assembly 13. For example, the second driving component 15 is fastened to an outer wall of the lens assembly 13, and the second driving component 15 may move to drive the lens assembly 13 to move. The second driving component 15 is located on an inner side of the inner edge of the first fastening part 121, and the second driving component 15 faces the other part of the magnetic component 17. For example, the other part of the magnetic component 17 faces the outer wall of the lens assembly 13, and the second driving component 15 faces the part of the magnetic component 17.

Similarly to the first driving component 14, the second driving component 15 may generate a magnetic field, and a magnetic force may be generated between the second driving component 15 and the magnetic component 17. The second driving component 15 may be driven to move by changing the magnetic force between the second driving component 15 and the magnetic component 17. For example, the magnetic component 17 may drive the second driving component 15 to move in the direction of the optical axis of the lens assembly 13, and the second driving component 15 drives the lens assembly 13 to move in the direction of the optical axis of the lens assembly 13, to adjust a focal length of the lens assembly 13.

The fastening bracket 12 is supported on the bottom of the casing 11 by using the second fastening part 122. The second fastening part 122 defines space between the first fastening part 121 and the inner bottom wall of the casing 11, and the space is at least used to accommodate the first driving component 14 and the image sensor component 16. As shown in FIG. 8, in a specific implementation, the second fastening part 122 may include a plurality of support parts 1221 disposed at intervals, each support part 1221 is connected to the side surface that is of the first fastening part 121 and that faces the bottom of the casing 11, and the first driving component 14 and the image sensor component 16 are located in space enclosed by the support parts 1221.

As shown in FIG. 8, an example in which a contour of an outer edge of the first fastening part 121 is a rectangular structure is used. There may be four support parts 1221, and the four support parts 1221 are respectively located in four corners of the first fastening part 121.

The magnetic component 17 is fixedly connected to the inner edge of the first fastening part 121, the first driving component 14 is movably connected to the side that is of the first fastening part 121 and that faces the bottom of the casing 11, and the image sensor component 16 is fixedly connected to the first driving component 14. An example in which the first driving component 14 translates or rotates in the plane in which the first driving component 14 is located is used. The image sensor component 16 translates or rotates with the first driving component 14. There should be a gap between the image sensor component 16 and the inner bottom wall of the casing 11, to prevent movement of the image sensor component 16 from being impeded by the inner bottom wall of the casing 11.

As shown in FIG. 8, in an implementation, at least two magnetic components 17 may be fastened to the inner edge of the first fastening part 121. Two magnetic components 17 are used as an example. The two magnetic components 17 may be disposed on two opposite sides of the first fastening part 121. The first driving component 14 and the second driving component 15 are driven to move by using the two magnetic components 17, so that a driving force of the magnetic components 17 on the first driving component 14 and the second driving component 15 can be enhanced. In addition, the two magnetic components 17 are opposite, so that it can be ensured that the first driving component 14 drives the image sensor component 16 to move smoothly, and the second driving component 15 drives the lens assembly 13 to move smoothly, thereby avoiding deflection of the image sensor 161 and the lens assembly 13 in a movement process.

In addition, a quantity of magnetic components 17 that are fastened to the inner edge of the first fastening part 121 may be four, six, eight, or the like. This is not limited in this embodiment. A plurality of magnetic components 17 are opposite to each other in pairs.

For example, the housing 2 of the camera module 1 may be, for example, in a shape of a cuboid. For example, a cross-sectional shape of the housing 2 in a direction perpendicular to an axial direction of the lens assembly 13 is a rectangle. The first fastening part 121 that is of the fastening bracket 12 and that matches a shape of the casing 11 may be a rectangular frame structure, and the lens assembly 13 partially penetrates an area surrounded by the rectangular frame. An example in which two or four magnetic components 17 that are opposite to each other in pairs are disposed on the inner edge of the first fastening part 121 is used. A contour of an inner edge of the rectangular frame may be a rectangle. If six or eight magnetic components 17 that are opposite to each other in pairs are disposed on the inner edge of the first fastening part 121, the contour of the inner edge of the rectangular frame may be correspondingly a hexagon or octagon.

In this embodiment, the magnetic component 17 is disposed on the fastening bracket 12, the magnetic component 17 is fastened to the inner edge of the first fastening part 121, the first driving component 14 and the image sensor component 16 are located in the space enclosed by the second fastening part 122, a part that is of the magnetic component 17 and that faces the first driving component 14 drives the first driving component 14 to move, the second driving component 15 is sleeved on the outer wall of the lens assembly 13, and a part that is of the magnetic component 17 and that faces the second driving component 15 drives the second driving component 15 to move. This simplifies a structure of the camera module 1, and reduces assembly difficulty of the camera module 1. In addition, the first driving component 14 and the second driving component 15 may be synchronously manufactured and tested for performance. This can accurately test image stabilization performance of the camera module 1, thereby improving reliability of the camera module 1.

Figure 9:
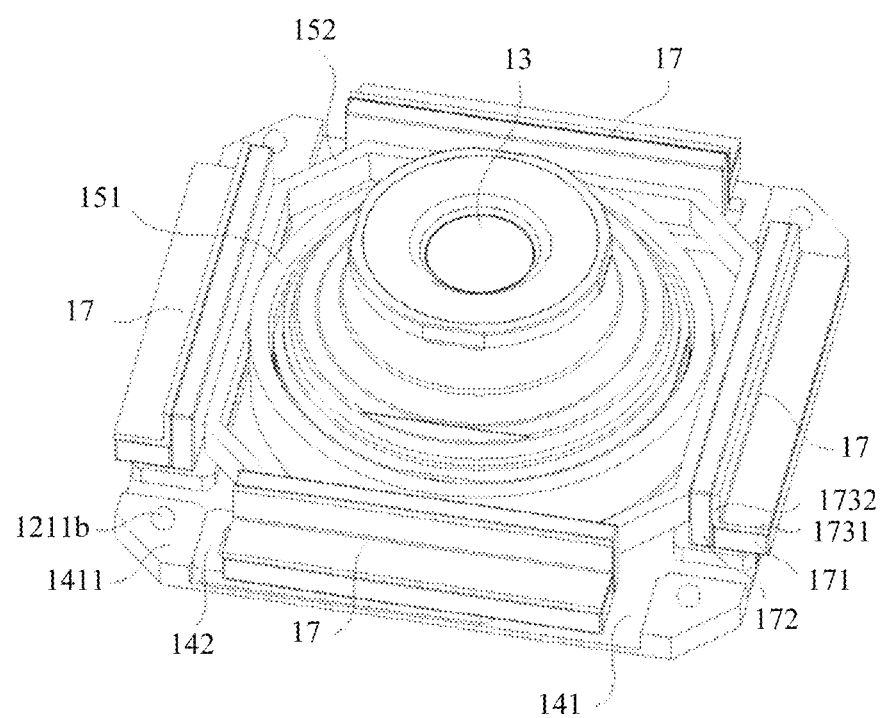
FIG. 9 is a schematic diagram of a structure obtained after a fastening bracket is removed in FIG. 7.
Figure 10:
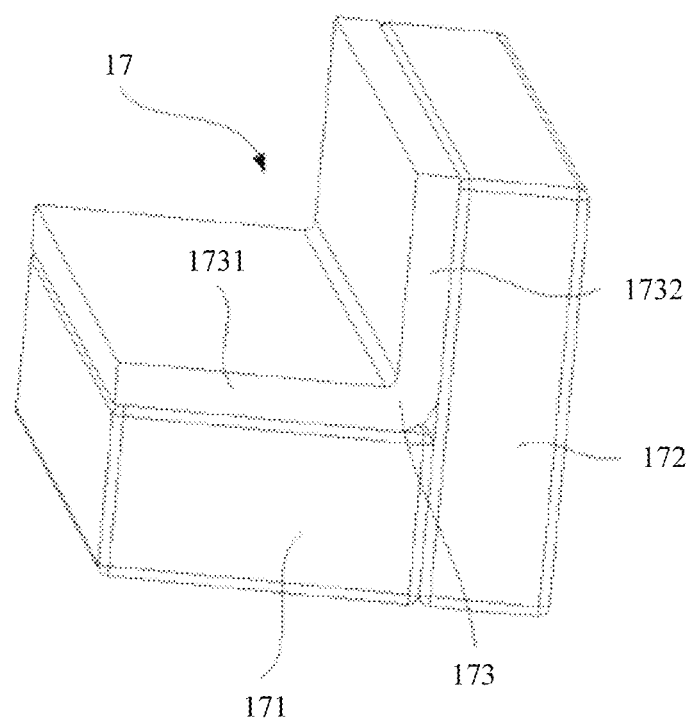
FIG. 10 is a schematic diagram of a structure of a magnetic component according to an embodiment of this application.

FIG. 9 is a schematic diagram of a structure obtained after a fastening bracket is removed in FIG. 7. FIG. 10 is a schematic diagram of a structure of a magnetic component according to an embodiment of this application. As shown in FIG. 9 and FIG. 10, the magnetic component 17 includes a first magnetic member 171 and a second magnetic member 172. The first magnetic member 171 faces the first driving component 14, and the second magnetic member 172 faces the second driving component 15. The first magnetic member 171 is configured to drive the first driving component 14 to move, and the second magnetic member 172 is configured to drive the second driving component 15 to move.

Specifically, the first magnetic member 171 is fastened to a side surface that is of the first fastening part 121 and that faces the first driving component 14, and the first magnetic member 171 faces a surface of the first driving component 14. The second magnetic member 172 is fastened to a side surface that is of the first fastening part 121 and that faces the second driving component 15, and the second magnetic member 172 faces a surface of the second driving component 15. For example, the first magnetic member 171 may be disposed in the direction perpendicular to the optical axis of the lens assembly 13, the second magnetic member 172 may be disposed in the direction of the optical axis of the lens assembly 13, and the first magnetic member 171 and the second magnetic member 172 are perpendicular to each other.

As shown in FIG. 8, in this embodiment, the first driving component 14 includes a support plate 141 and a first driving coil 142. For example, a plate surface of the support plate 141 may be perpendicular to the optical axis of the lens assembly 13. The first driving coil 142 is disposed on a surface that is of the support plate 141 and that faces the first magnetic member 171. The image sensor component 16 is connected to the other side surface of the support plate 141. The first driving coil 142 corresponds to the first magnetic member 171. To match a quantity of first magnetic members 171, there may be one or more first driving coils 142.

The first driving coil 142 is fastened to the support plate 141. For example, the first driving coil 142 may be adhered or welded to the support plate 141, or the first driving coil 142 is locked to the support plate 141 by using a connecting piece such as a bolt or a screw. In addition, to reduce self-weight of the first driving component 14, the first driving coil 142 may be provided with a lightening hole 1421. This facilitates movement of the first driving component 14.

The first driving component 14 may be connected to an external circuit, for example, the first driving component 14 is electrically connected to the circuit board 4 in the electronic device 100. When the user holds the electronic device 100 for photographing, the circuit board 4 controls the first driving component 14 to work. The first driving coil 142 is energized to generate an electromagnetic field, and a magnetic force is generated between the first driving coil 142 and the first magnetic member 171. The magnetic force drives the first driving coil 142 to move. The first driving coil 142 drives the image sensor component 16 to move by using the support plate 141.

In actual application, an acceleration sensor is usually further disposed in the electronic device 100, and a movement direction and a movement amount of the electronic device 100 are detected by using the acceleration sensor. For example, the acceleration sensor detects a hand shake direction and a shake amount of the user during photographing, and the acceleration sensor transmits the shake signal to a processor in the circuit board 4. The processor determines, based on the shake signal, a movement direction and a movement amount required by the image sensor component 16 for compensation, controls a direction and a magnitude of a current in the first driving coil 142, and adjusts a direction of the magnetic field and a magnitude of the magnetic force that are generated between the first driving coil 142 and the first magnetic member 171, to control a movement direction and a movement amount of the first driving component 14. The first driving component 14 drives the image sensor component 16 to move. For example, the first driving component 14 drives the image sensor component 16 to translate or rotate in the plane in which the image sensor component 16 is located, to compensate for interference caused by hand shake of the user during photographing, improve a blurring phenomenon of an image, and improve image quality.

As shown in FIG. 9, in this embodiment, the second driving component 15 includes a support base 151 and a second driving coil 152. The support base 151 is sleeved on the outer wall of the lens assembly 13, and is configured to support the lens assembly 13. For example, the outer wall of the lens assembly 13 may be provided with an external thread, an inner wall of the support base 151 is provided with an internal thread, and the support base 151 is thread-connected to the outer wall of the lens assembly 13. The second driving coil 152 is sleeved on an outer wall of the support base 151, and the second driving coil 152 is fixedly connected to the support base 151.

The second driving component 15 may be electrically connected to the circuit board 4 in the electronic device 100. When the user holds the electronic device 100 for photographing, the circuit board 4 controls the second driving component 15 to work. The second driving coil 152 is energized to generate an electromagnetic field, and a magnetic force is generated between the second driving coil 152 and the second magnetic member 172. The magnetic force drives the second driving coil 152 to move. The second driving coil 152 drives the lens assembly 13 to move by using the support base 151.

The user inputs a photographing instruction when photographing an image. For example, the user inputs a focusing instruction by operating a display interface of the electronic device 100. The circuit board 4 in the electronic device 100 receives the focusing instruction, controls a direction and a magnitude of a current in the second driving coil 152, and adjusts a direction of the magnetic field and a magnitude of the magnetic force that are generated between the second driving coil 152 and the second magnetic member 172, to control a movement direction and a movement amount of the second driving component 15. The second driving component 15 drives the lens assembly 13 to move. For example, the second driving component 15 drives the lens assembly 13 to move in the direction of the optical axis of the lens assembly 13, to perform focusing on a photographed object.

In addition, to generate a balanced magnetic force between various parts of the second driving coil 152 and various parts of the second magnetic member 172, an area that is on a surface of the second driving coil 152 and that is opposite to the second magnetic member 172 may be parallel to a surface of the second magnetic member 172. An example in which four second magnetic members 172 are evenly disposed at intervals in a circumferential direction of the inner edge of the first fastening part 121 is used. The second driving coil 152 may be approximately a rectangular coil, and each side of the second driving coil 152 corresponds to the second magnetic member 172. Alternatively, six or eight second magnetic members 172 are evenly disposed at intervals in a circumferential direction of the inner edge of the first fastening part 121, and correspondingly, the second driving coil 152 is substantially a hexagonal or octagonal coil.

The outer wall of the lens assembly 13 is usually a cylindrical surface. Therefore, the support base 151 may be a circular structural member. For a case in which the second driving coil 152 is a rectangular coil, a hexagonal coil, an octagonal coil, or the like, some areas on an inner wall of the second driving coil 152 may be fastened to the outer wall of the support base 151. For example, these areas of the second driving coil 152 are adhered or welded to the outer wall of the support base 151.

In some embodiments, the first magnetic member 171 and the second magnetic member 172 may be fastened to the first fastening part 121. Specifically, the first magnetic member 171 is fastened to the side surface that is of the first fastening part 121 and that faces the first driving component 14, and the second magnetic member 172 is fastened to the side surface that is of the first fastening part 121 and that faces the second driving component 15. For example, the first magnetic member 171 and the second magnetic member 172 may be adhered to a surface of the first fastening part 121.

As shown in FIG. 6, in some other embodiments, the magnetic component 17 may further include a magnetoconductive member 173. The magnetoconductive member 173 is fastened to the first fastening part 121, and the first magnetic member 171 and the second magnetic member 172 are fastened by using the magnetoconductive member 173. The magnetoconductive member 173 includes a first magnetoconductive part 1731 and a second magnetoconductive part 1732. The first magnetoconductive part 1731 faces the first driving component 14, the second magnetoconductive part 1732 faces the second driving component 15, the first magnetic member 171 is fastened to the first magnetoconductive part 1731, and the second magnetic member 172 is fastened to the second magnetoconductive part 1732.

As shown in FIG. 10, an example in which the first magnetic member 171 and the second magnetic member 172 are perpendicular to each other is used. The first magnetoconductive part 1731 and the second magnetoconductive part 1732 of the magnetoconductive member 173 may be perpendicular to each other. Magnetic poles of the first magnetoconductive part 1731 and the second magnetoconductive part 1732 are opposite to each other. For example, the first magnetoconductive part 1731 is a north pole (N pole), and the second magnetoconductive part 1732 is a south pole (S pole); or the first magnetoconductive part 1731 is an S pole, and the second magnetoconductive part 1732 is an N pole.

The surface of the first magnetic member 171 is attached to a surface of the first magnetoconductive part 1731, and the surface of the second magnetic member 172 is attached to a surface of the second magnetoconductive part 1732. The first magnetic member 171 may be absorbed to the surface of the first magnetoconductive part 1731 by using magnetic adsorption action, and the second magnetic member 172 may also be adsorbed to the surface of the second magnetoconductive part 1732 by using magnetic adsorption action.

For example, the first magnetoconductive part 1731 is an N pole, a side that is of the first magnetic member 171 and that is adsorbed to the first magnetoconductive part 1731 is an S pole, and a side that is of the first magnetic member 171 and that faces the first driving component 14 is an N pole. The second magnetoconductive part 1732 is an S pole, a side that is of the second magnetic member 172 and that is adsorbed to the second magnetoconductive part 1732 is an N pole, and a side that is of the second magnetoconductive member 173 and that faces the second driving component 15 is an S pole.

Alternatively, the first magnetoconductive part 1731 is an S pole, a side that is of the first magnetic member 171 and that is adsorbed to the first magnetoconductive part 1731 is an N pole, and a side that is of the first magnetic member 171 and that faces the first driving component 14 is an S pole. The second magnetoconductive part 1732 is an N pole, a side that is of the second magnetic member 172 and that is adsorbed to the second magnetoconductive part 1732 is an S pole, and a side that is of the second magnetoconductive member 173 and that faces the second driving component 15 is an N pole.

To securely connect the first magnetic member 171 and the second magnetic member 172 to the magnetoconductive member 173, on a basis that both the first magnetic member 171 and the second magnetic member 172 are adsorbed to the surface of the magnetoconductive member 173 by using magnetic adsorption action, the first magnetic member 171 and the first magnetoconductive part 1731, and the second magnetic member 172 and the second magnetoconductive part 1732 may be further connected to each other by using an adhesive. For example, both the first magnetic member 171 and the second magnetic member 172 are adhered to the magnetoconductive member 173 by using a strong adhesive.

The magnetoconductive member 173 may be adhered or welded to the first fastening part 121. Specifically, as shown in FIG. 6, a side wall that is of the first fastening part 121 and that faces the lens assembly 13 and a side wall that is of the first fastening part 121 and that faces the bottom of the casing 11 may be perpendicular to each other, the surface of the first magnetoconductive part 1731 of the magnetoconductive member 173 is attached to the surface that is of the first fastening part 121 and that faces the bottom of the casing 11, and the surface of the second magnetoconductive part 1732 of the magnetoconductive member 173 is attached to the side wall that is of the first fastening part 121 and that faces the lens assembly 13.

Figure 11:
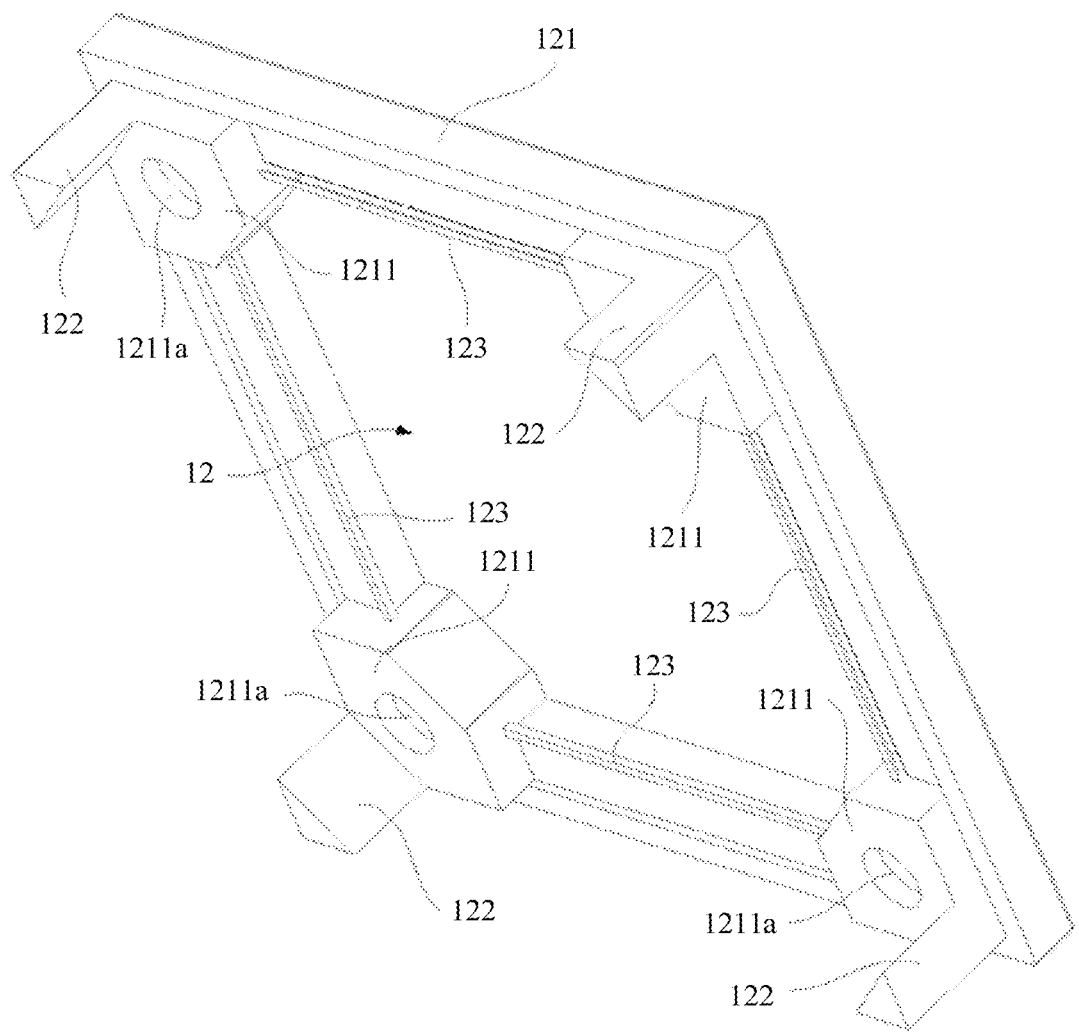
FIG. 11 is a schematic diagram of a structure of a fastening bracket according to an embodiment of this application.

FIG. 11 is a schematic diagram of a structure of a fastening bracket according to an embodiment of this application. As shown in FIG. 11, a positioning plate 123 may be further disposed on the fastening bracket 12, and the positioning plate 123 has a strengthening effect on fastening of the magnetoconductive member 173, to ensure that the magnetoconductive member 173 and the first fastening part 121 are connected securely. In a specific implementation, the positioning plate 123 may be supported on a bending part of the magnetoconductive member 173, that is, the positioning plate 123 is located at a connection part between the first magnetoconductive part 1731 and the second magnetoconductive part 1732. The positioning plate 123 may include two parts perpendicular to each other, to match a structure of the connection part between the first magnetoconductive part 1731 and the second magnetoconductive part 1732.

There is a gap between the positioning plate 123 and the first fastening part 121. A width of the gap matches a thickness of the magnetoconductive member 173. One side of the magnetoconductive member 173 is attached to the first fastening part 121, and a bending part on the other side surface of the magnetoconductive member 173 is attached to the positioning plate 123. For example, two ends of the positioning board 123 are respectively connected to support parts 1221 on two sides thereof. Alternatively, the first fastening part 121 has a structure for fastening the positioning plate 123, and two ends of the positioning plate 123 are fastened to the first fastening part 121.

Figure 12:
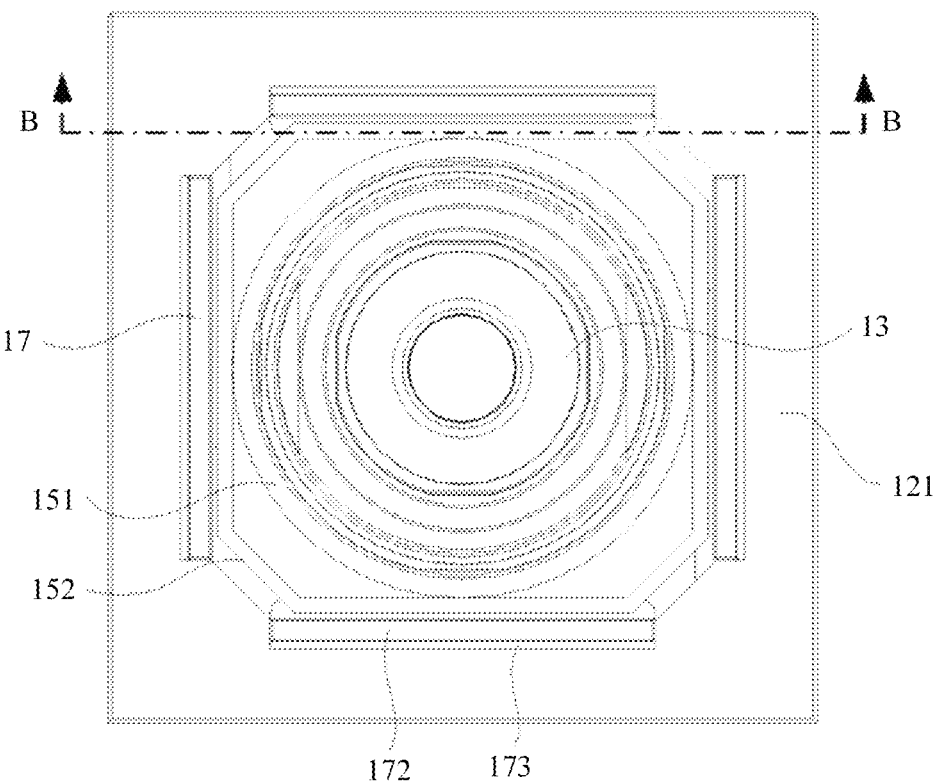
FIG. 12 is a main view of FIG. 7.
Figure 13:
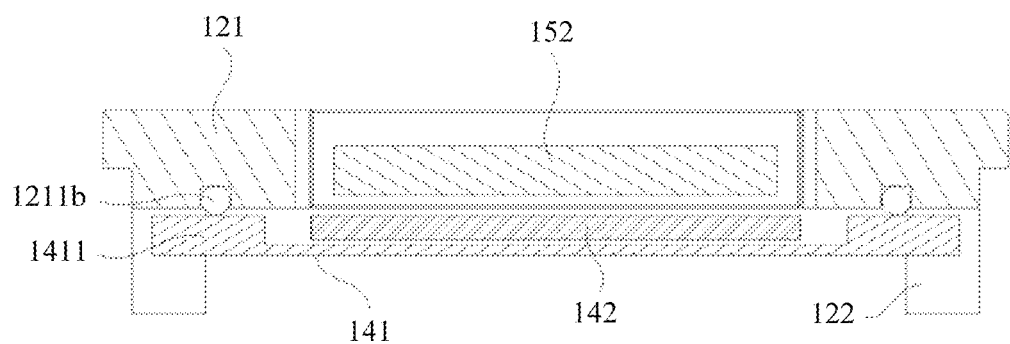
FIG. 13 is a sectional view along B-B in FIG. 12.

FIG. 12 is a main view of FIG. 7. FIG. 13 is a sectional view along B-B in FIG. 12. As shown in FIG. 13, in this embodiment, the first driving component 14 and the first fastening part 121 are in contact with each other through rolling. Specifically, a side surface that is of the support plate 141 and that faces the first fastening part 121 and the surface of the first fastening part 121 are in contact with each other through rolling, to ensure that the first driving component 14 smoothly moves in the plane on which the first driving component 14 is located.

Specifically, a first limiting part 1211 is disposed on the first fastening part 121, a second limiting part 1411 is disposed on the surface that is of the support plate 141 and that faces the first fastening part 121, the second limiting part 1411 is opposite to the first limiting part 1211, a ball 1211b is disposed between the first limiting part 1211 and the second limiting part 1411, and the first limiting part 1211 and the second limiting part 1411 are in contact with each other by using the ball 1211b.

As shown in FIG. 8 and FIG. 11, for example, the first limiting part 1211 may be a limiting boss located on a side surface that is of the first fastening part 121 and that faces the support plate 141, the second limiting part 1411 may be a limiting boss on the support plate 141, the limiting boss protrudes toward the first fastening part 121, and the ball 1211b is located between the first limiting part 1211 and the second limiting part 1411. When the support plate 141 moves in a plane in which the support plate 141 is located, the ball 1211b rolls between the first limiting part 1211 and the second limiting part 1411, and the support plate 141 and the first fastening part 121 are not in contact with each other, so that friction between the support plate 141 and the first fastening part 121 can be reduced, to ensure that the support plate 141 flexibly moves.

In this embodiment, at least one first limiting part 1211 is disposed on the first fastening part 121, and at least one second limiting part 1411 is disposed on the support plate 141. To ensure stable contact between the support plate 141 and the first fastening part 121, and ensure smooth movement of the support plate 141, at least two first limiting parts 1211 are disposed on the first fastening part 121, and at least two second limiting parts 1411 are disposed on the support plate 141.

An example in which two first limiting parts 1211 and two second limiting parts 1411 are respectively disposed on the first fastening part 121 and the support plate 141 is used. The two first limiting parts 1211 may be respectively located on two opposite sides of the first fastening part 121. Corresponding to the two first limiting parts 1211, the two second limiting parts 1411 may be respectively located on two opposite sides of the support plate 141, to ensure balance between two sides of the support plate 141 and ensure stability of the support plate 141.

It may be understood that a quantity of first limiting parts 1211 disposed on the first fastening part 121 is not limited to two, and the quantity of first limiting parts 1211 may be four, six, eight, or the like. Corresponding to the first limiting part 1211, a quantity of second limiting parts 1411 disposed on the support plate 141 is not limited to two, and the quantity of second limiting parts 1411 may be four, six, eight, or the like. Both the plurality of first limiting parts 1211 and the plurality of second limiting parts 1411 may be symmetrically disposed in pairs, to ensure balance of the support plate 141.

In a rolling process, a position of the ball 1211b may be shifted. To limit a movement range of the ball 1211b and prevent the ball 1211b from falling out between the first limiting part 1211 and the second limiting part 1411, in an implementation, a limiting recess 1211a may be disposed on one of the first limiting part 1211 and the second limiting part 1411, and the ball 1211b moves in the limiting recess 1211a.

As shown in FIG. 11 and FIG. 13, for example, a limiting recess 1211a is disposed on a side surface that is of the first limiting part 1211 and that faces the second limiting part 1411, and the ball 1211b is located in the limiting recess 1211a and is in contact with a surface of the second limiting part 1411. An inner diameter of the limiting recess 1211a may match an outer diameter of the ball 1211b, the ball 1211b rotates in the limiting recess 1211a, and the position of the ball 1211b is fixed. Alternatively, an inner diameter of the limiting recess 1211a may be greater than an outer diameter of the ball 1211b, and the ball 1211b may rotate and move in the limiting recess 1211a.

In addition, as shown in FIG. 13, a diameter of the ball 1211b may be greater than a depth of the limiting recess 1211a, so that one part of the ball 1211b is located in the limiting recess 1211a, and the other part of the ball 1211b is exposed outside the limiting recess 1211a. The part that is of the ball 1211b and that is exposed outside the limiting recess 1211a is located between a surface of the first limiting part 1211 and the surface of the second limiting part 1411. In this way, there is a gap between the first limiting part 1211 and the second limiting part 1411, to avoid contact between the first limiting part 1211 and the second limiting part 1411, and prevent the first limiting part 1211 from impeding movement of the support plate 141.

As shown in FIG. 6, in this embodiment, based on a magnetic attraction force between the first driving coil 142 on the support plate 141 and the first magnetic member 171 on the first fastening part 121, the first driving component 14 is movably connected to the first fastening part 121 by using magnetic absorption action, and the ball 1211b is disposed between the first limiting part 1211 on the first fastening part 121 and the second limiting part 1411 on the support plate 141, so that there is a gap between the support plate 141 and the first fastening part 121, and the support plate 141 and the first fastening part 121 are in contact with each other through rolling.

On this basis, to ensure stable contact between the support plate 141 and the first fastening part 121, in an implementation, the support plate 141 may be a magnetoconductive plate. In this way, the first magnetic member 171 on the first fastening part 121 generates a magnetic attraction force for the support plate 141, so that not only a magnetic force exists between the first driving coil 142 and the first magnetic member 171, but also a magnetic force exists between the support plate 141 and the first magnetic member 171. Therefore, a magnetic attraction force between the first driving component 14 and the first magnetic member 171 can be enhanced, to ensure that the support plate 141 is always in contact with the first fastening part 121, and prevent the support plate 141 from loosening.

It should be noted that, as shown in FIG. 11, the fastening bracket 12 may be an integrally formed part, the first fastening part 121 and the second fastening part 122 are a whole, and the second fastening part 122 is formed on the side that is of the first fastening part 121 and that faces the bottom of the casing 11.

In another embodiment, the first fastening part 121 and the second fastening part 122 may be separately designed and processed, and the first fastening part 121 and the second fastening part 122 are connected together to form the fastening bracket 12. For example, the first fastening part 121 and the second fastening part 122 are adhered, welded, or connected by using a connecting piece such as a bolt, a screw, or a rivet. Therefore, the first fastening part 121 may be an annular member, and the second fastening part 122 may include a plurality of separate support parts 1221. Alternatively, the second fastening part 122 includes an annular part as a main body, the annular part matches the first fastening part 121, the annular part is attached and connected to the first fastening part 121, and each support part 1221 is connected to the annular part. The first limiting part 1211 located on the fastening bracket 12 may be formed on the first fastening part 121 or the second fastening part 122.

As shown in FIG. 4 and FIG. 6, in the camera module 1 provided in this embodiment, the image sensor component 16 includes an image sensor 161 and a flexible electrical connecting piece 162. The image sensor 161 is located on the light exit side of the lens assembly 13, for example, the optical axis of the lens assembly 13 passes through the center of the image sensor 161. Light emitted from the lens assembly 13 irradiates on the image sensor 161, and the image sensor 161 converts a signal of the emitted light into an electrical signal through photoelectric conversion, to implement an imaging function of the camera module 1.

The flexible electrical connecting piece 162 is configured to electrically connect the image sensor 161 to an external circuit, to control image sensing working by using the external circuit. Specifically, one end of the flexible electrical connecting piece 162 is connected to the image sensor 161, and the other end of the flexible electrical connecting piece 162 is connected to the external circuit. For example, the other end of the flexible electrical connecting piece 162 is connected to the circuit board 4 in the electronic device 100. When the user performs photographing, the processor in the circuit board 4 controls the image sensor 161 to work.

The image sensor 161 generates heat in a working process, and the heat is accumulated on the image sensor 161. As a result, performance of the image sensor 161 may be affected, and the image sensor 161 cannot work normally in a severe case. Therefore, heat dissipation needs to be performed on the image sensor 161. In the related technology, heat dissipation is performed on the image sensor 161 by using an air gap between the image sensor 161 and the bottom of the casing 11, and heat dissipation efficiency is low. As a result, the image sensor 161 cannot work in a high power consumption mode for a long time. For example, 5 minutes after the user starts a camera on the electronic device 100, the image sensor 161 enters a thermal protection mode, and stops working.

Figure 14:
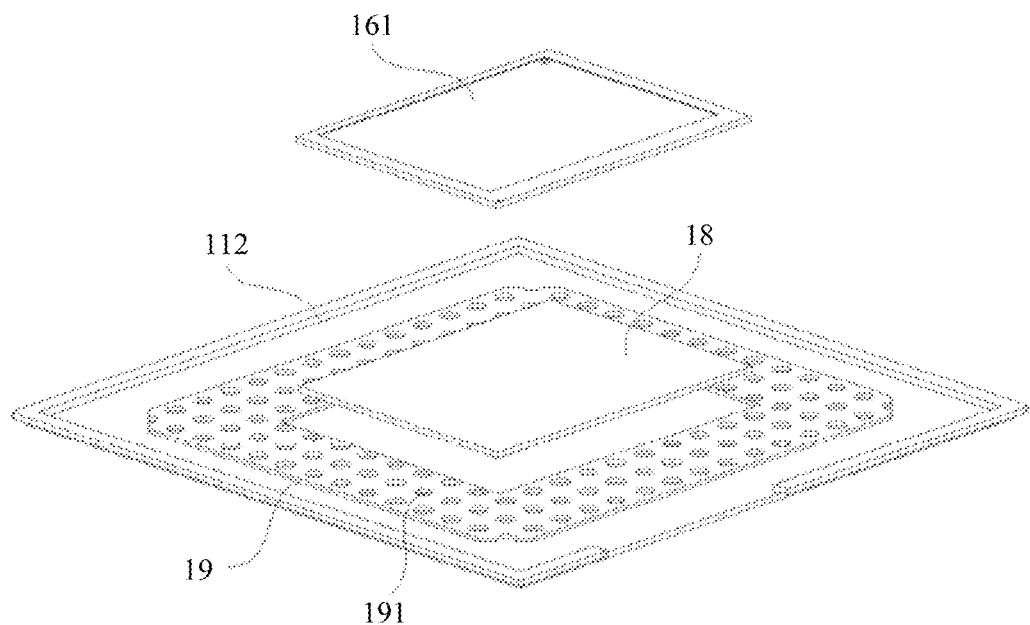
FIG. 14 is an exploded view in which an image sensor is in contact with a bottom plate according to an embodiment of this application.

FIG. 14 is an exploded view in which an image sensor is in contact with a bottom plate according to an embodiment of this application. As shown in FIG. 6 and FIG. 14, in this embodiment, there is a gap between a heat dissipation surface (a side surface that is of the image sensor 161 and that faces the inner bottom wall of the casing 11) of the image sensor 161 and the inner bottom wall of the casing 11 (the bottom plate 112), the gap is filled with a thermally conductive liquid 18, and heat dissipation is performed on the image sensor 161 by using the heat transfer liquid 18.

Heat of the heat dissipation surface of the image sensor 161 is transferred to the thermally conductive liquid 18 by using thermal conduction action, and the thermally conductive liquid 18 conducts the heat to the bottom plate 112, to dissipate the heat to the outside by using the bottom plate 112, so as to dissipate heat for the image sensor 161. Based on the thermal conduction action of the thermally conductive liquid 18, heat dissipation efficiency of the image sensor 161 can be improved, and a heat dissipation effect of the image sensor 161 can be improved, thereby ensuring working performance of the image sensor 161.

As shown in FIG. 14, an annular sealing plate 19 is affixed to the bottom plate 112 of the casing 11, and the thermally conductive liquid 18 is located in an area enclosed by the annular sealing plate 19. The thermally conductive liquid 18 is flowable liquid, and the annular sealing plate 19 is disposed on the bottom plate 112 of the casing 11, so that the thermally conductive liquid 18 is limited in the area enclosed by the annular sealing plate 19. The area enclosed by the annular sealing plate 19 may correspond to the heat dissipation surface of the image sensor 161. In this way, an area in which the thermally conductive liquid 18 is located corresponds to the heat dissipation surface of the image sensor 161, to ensure a thermal conduction effect of the thermally conductive liquid 18 on the image sensor 161.

To enable the thermally conductive liquid 18 to be fully in contact with the heat dissipation surface of the image sensor 161, there may be a gap between the annular sealing plate 19 and the heat dissipation surface of the image sensor 161, and a liquid surface of the thermally conductive liquid 18 may be higher than a surface of the annular sealing plate 19. It should be noted that, because the gap between the annular sealing plate 19 and the image sensor 161 is very small, based on surface tension action of the thermally conductive liquid 18 in the gap, the thermally conductive liquid 18 can be prevented from spilling out of the annular sealing plate 19.

In addition, after the thermally conductive liquid 18 absorbs heat of the image sensor 161, a temperature thereof increases, and a volume of the thermally conductive liquid 18 expands to a specific extent. As a result, the thermally conductive liquid 18 spills out. The gap between the annular sealing plate 19 and the image sensor 161 may accommodate an expansion amount of the thermally conductive liquid 18. In addition, due to capillary action of the gap, the thermally conductive liquid 18 may be limited in an area in which the annular sealing plate 19 is located, to prevent the thermally conductive liquid 18 from spilling out of the annular sealing plate 19 and affecting another device of the camera module 1.

As shown in FIG. 14, in an implementation, a plurality of sealing holes 191 may be disposed at intervals on the annular sealing plate 19. The plurality of sealing holes 191 are disposed. In this way, when the thermally conductive liquid 18 spills out along the surface of the annular sealing plate 19, the thermally conductive liquid 18 enters each sealing hole 191, and the thermally conductive liquid 18 is sealed and stored by using the sealing hole 191, to prevent the thermally conductive liquid 18 from spilling out of the annular sealing plate 19.

In another implementation, as an alternative to the sealing hole 191, the surface of the annular sealing plate 19 may be an uneven corrugated surface. When the thermally conductive liquid 18 spills out along the surface of the annular sealing plate 19, a recessed area between two adjacent protrusions of the corrugated surface is used to store the thermally conductive liquid 18. A gap is formed between the top of a raised area of the corrugated surface and the image sensor 161. Based on surface tension action of the thermally conductive liquid 18 in the gap, the thermally conductive liquid 18 can be prevented from diffusing outward. Therefore, the corrugated surface can prevent the thermally conductive liquid 18 from spilling out of the annular sealing plate 19.

When the corrugated surface is processed on the surface of the annular sealing plate 19 to seal and store the thermally conductive liquid 18, to prevent the thermally conductive liquid 18 from flowing to an end part of the annular sealing plate 19 along the recessed area of the corrugated surface, a stop edge may be disposed on an outer edge of the annular sealing plate 19, and a height of the stop edge is greater than a thickness of the recessed area of the corrugated surface. For example, the stop edge is flush with the top of the raised area of the corrugated surface.

In addition, a corrugation extension direction (extension directions of the raised area and the recessed area) of the corrugated surface may be consistent with an extension direction of each side of the annular sealing plate 19. An example in which the annular sealing plate 19 is a rectangular frame structure is used. A corrugation extension direction of a corrugated surface on one side of the annular sealing plate 19 is consistent with an extension direction of the side. In this way, when spilling out, the thermally conductive liquid 18 needs to cross a protrusion on the corrugated surface to reach an adjacent recessed area, so that the corrugated surface can effectively prevent the thermally conductive liquid 18 from spilling out.

Figure 15:
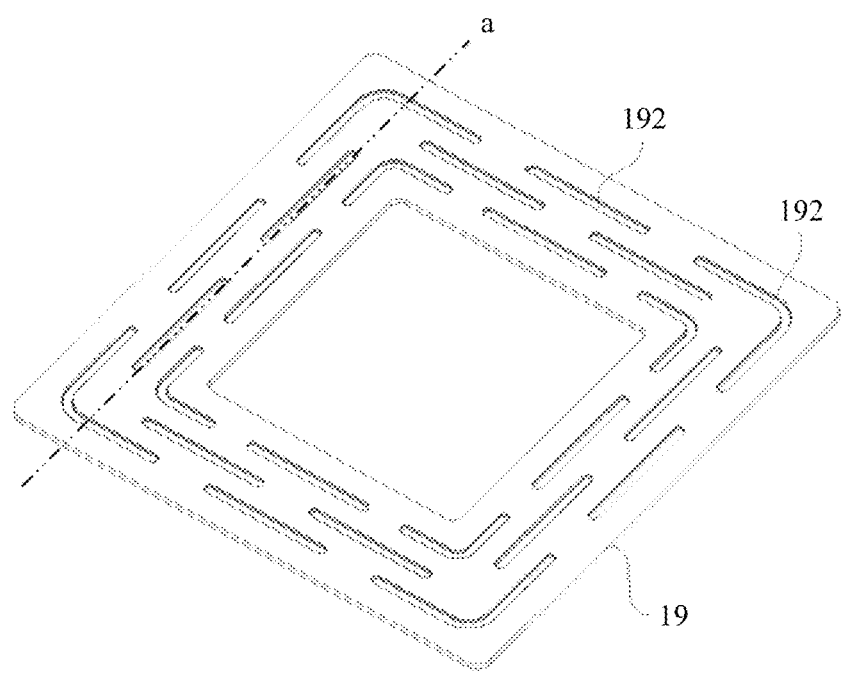
FIG. 15 is a schematic diagram of a structure of an annular sealing plate according to an embodiment of this application.

FIG. 15 is a schematic diagram of a structure of an annular sealing plate according to an embodiment of this application. As shown in FIG. 15, in another implementation, as an alternative to the sealing hole 191, a plurality of strip-shaped grooves 192 may be disposed at intervals on the surface of the annular sealing plate 19, and extend in a direction of a contour line of the annular sealing plate 19. An example in which a contour of the annular sealing plate 19 is a rectangular frame is used. The strip-shaped groove 192 may extend in a direction of an edge length of the annular sealing plate 19. The strip-shaped groove 192 located at a corner of the annular sealing plate 19 may extend in a direction of two sides. For example, the strip-shaped groove 192 located at the corner of the annular sealing plate 19 is a vertically curved strip-shaped groove 192.

Due to this disposition, when the thermally conductive liquid 18 spills out, the strip-shaped groove 192 may store the thermally conductive liquid 18. In addition, because the extension direction of the strip-shaped groove 192 is approximately perpendicular to a spilling direction of the thermally conductive liquid 18, the strip-shaped groove 192 prevents the thermally conductive liquid 18 from spilling out.

It may be understood that the strip-shaped grooves 192 are disposed at intervals on the surface of the annular sealing plate 19, and adjacent strip-shaped grooves 192 do not communicate with each other. This has small impact on strength of the annular sealing plate 19, and can prevent the annular sealing plate 19 from being bent or even broken. In addition, an example in which the annular sealing plate 19 is bent along a line a in FIG. 15 is used. Because extension directions of strip-shaped grooves 192 at two ends of a bending part are perpendicular to an extension direction of a strip-shaped grooves 192 in the middle, strength of the annular sealing plate 19 is enhanced.

In addition, as shown in FIG. 15, a plurality of rows of strip-shaped grooves 192 may be disposed at intervals from an inner edge to an outer edge of the annular sealing plate 19, and strip-shaped grooves 192 in different rows are staggered. In this way, in a direction from the inner edge to the outer edge of the annular sealing plate 19, intervals formed between adjacent strip-shaped grooves 192 are also staggered back and forth. When the thermally conductive liquid 18 in a strip-shaped groove 192 close to the inner edge spills out, the thermally conductive liquid 18 spills from an end part of the strip-shaped groove 192 to be stored in a strip-shaped groove 192 close to the outer edge, to prevent the thermally conductive liquid 18 from spilling out.

For example, the annular sealing plate 19 may be a rubber plate or a silicone plate. An example in which a plurality of sealing holes 191 are disposed at intervals on the annular sealing plate 19 is used. The annular sealing plate 19 is a porous rubber plate or a porous silicone plate.

Figure 16:
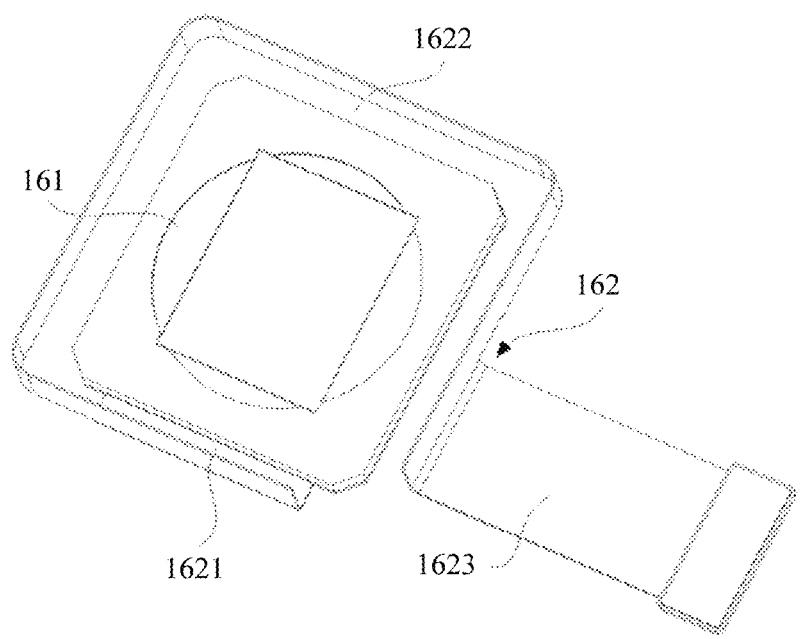
FIG. 16 is a schematic diagram of a structure of an image sensor component according to an embodiment of this application.

FIG. 16 is a schematic diagram of a structure of an image sensor component according to an embodiment of this application. As shown in FIG. 16, the flexible electrical connecting piece 162 connected to the image sensor 161 may include a connecting part 1621, a movable cantilever 1622, and a mounting part 1623. The connecting part 1621 is connected to the image sensor 161, the mounting part 1623 is connected to an external circuit (for example, the circuit board 4 of the electronic device 100), and the movable cantilever 1622 is located between the connecting part 1621 and the mounting part 1623.

The connecting part 1621 is connected to a side surface of the image sensor 161, the movable cantilever 1622 extends around the image sensor 161, the movable cantilever 1622 is located inside the casing 11 of the camera module 1, one end of the mounting part 1623 is connected to the movable cantilever 1622, the mounting part 1623 extends out of the casing 11, the mounting part 1623 extends toward the circuit board 4, and the other end of the mounting part 1623 is connected to the circuit board 4. For example, an end part of the mounting part 1623 is connected to the circuit board 4 by using an electrical connector.

The movable cantilever 1622 is a movable part of the flexible electrical connecting piece 162. When the image sensor 161 moves with the first driving component 14, the movable cantilever 1622 correspondingly deforms and moves, to prevent the flexible electrical connecting piece 162 from limiting movement of the image sensor 161.

In this embodiment, the movable cantilever 1622 may surround the image sensor 161 at least half a circle. For example, the connecting part 1621 is connected to a side edge on one side of the image sensor 161, and the movable cantilever 1622 surrounds the image sensor 161 from the side edge connected to the connecting part 1621, and extends to an adjacent side edge. In this way, the movable cantilever 1622 includes at least two parts that extend in different directions, and the movable cantilever 1622 can enable the image sensor 161 to move in any direction in the plane in which the image sensor 161 is located.

As shown in FIG. 16, in a specific implementation, the movable cantilever 1622 may surround the image sensor 161 one circle. With the flexible electrical connecting piece 162 as a whole, after the flexible electrical connecting piece 162 surrounds the image sensor 161 one circle from an end that is of the flexible electrical connecting piece 162 and that is connected to the image sensor 161, the flexible electrical connecting piece 162 extends out of the casing 11. In this way, the movable cantilever 1622 may provide sufficient freedom for the image sensor 161, so that movement of the image sensor 161 is not limited. It should be noted that the movable cantilever 1622 is an elastic cantilever, and after being deformed, the movable cantilever 1622 may be restored to an initial shape, to provide a reliable guarantee for movement of the image sensor 161.

In addition, the connecting part 1621 of the flexible electrical connecting piece 162 may be level with the surface of the image sensor 161, and the movable cantilever 1622 is perpendicular to the surface of the image sensor 161. In this way, the movable cantilever 1622 easily deforms and moves. Because the mounting part 1623 extends out of the casing 11 and is connected to the circuit board 4, the mounting part 1623 may be attached to an inner wall of the rear cover 21 of the electronic device 100. The mounting part 1623 is also level with the surface of the image sensor 161.

As shown in FIG. 6, in some embodiments, the image sensor component 16 may further include a light-transmitting plate 163. The light-transmitting plate 163 may be a transparent protection plate, and the light-transmitting plate 163 is configured to protect the image sensor 161 from damage. Alternatively, the light-transmitting plate 163 may be a filter plate, and the light-transmitting plate 163 is configured to filter out light of a specific wavelength. For example, the light-transmitting plate 163 is configured to filter out invisible light, for example, filter out an infrared ray or an ultraviolet ray.

In the camera module 1 provided in this embodiment, the fastening bracket 12 is disposed in the casing 11, the fastening bracket 12 includes the first fastening part 121 and the second fastening part 122, the first fastening part 121 is sleeved outside the lens assembly 13, one end of the second fastening part 122 is connected to the side that is of the first fastening part 121 and that faces the bottom of the casing 11, the other end of the second fastening part 122 is supported on the bottom of the casing 11, the magnetic component 17 is disposed on the inner edge of the first fastening part 121, a part that is of the magnetic component 17 and that faces the first driving component 14 is configured to drive the first driving component 14 to move, a part that is of the magnetic component 17 and that faces the second driving component 15 is configured to drive the second driving component 15 to move, and the image sensor component 16 and the lens assembly 13 are respectively driven to move by using the first driving component 14 and the second driving component 15. The first driving component 14 and the second driving component 15 are driven by using the magnetic component 17 disposed on the fastening bracket 12. Therefore, a structure of the camera module 1 is simplified, an assembly process of the camera module 1 is simple, and it is easy to test performance of the camera module 1, thereby improving reliability of the camera module 1.

An embodiment further provides an assembly method for a camera module, and the assembly method is used to assemble the camera module 1 described above. Specifically, the assembly method includes the following steps.

A lens assembly 13 is provided, and a second driving component 15 is sleeved on an outer wall of the lens assembly 13.

A fastening bracket 12 is provided, where the fastening bracket 12 includes a first fastening part 121 and a second fastening part 122, and the second fastening part 122 is connected to a bottom surface of the first fastening part 121; and at least one magnetic component 17 is fastened to an inner edge of the first fastening part 121.

A first driving component 14 is provided.

It may be understood that the step of sleeving the second driving component 15 on the lens assembly 13 and the step of fastening the magnetic component 17 to the fastening bracket 12 may be successively and separately performed. A sequence between the process of providing the first driving component 14, the assembly process of the lens assembly 13 and the second driving component 15, and the assembly process of the fastening bracket 12 and the magnetic component 17 is not limited in this embodiment. The first driving component 14 and the second driving component 15 may be synchronously manufactured.

Next, the fastening bracket 12 is sleeved outside the lens assembly 13, so that the second driving component 15 on an outer wall of the lens assembly 13 faces one part of the magnetic component 17 on the inner edge of the first fastening part 121.

Then, the first driving component 14 is connected to the fastening bracket 12, so that one side surface of the first driving component 14 faces the other part of the magnetic component 17.

After the first driving component 14 is assembled on the fastening bracket 12, an image sensor component 16 is fastened to the other side surface of the first driving component 14.

Finally, a casing 11 is sleeved outside the fastening bracket 12. The casing 11 may include an outer frame 111 and a bottom plate 112, and the image sensor component 16 is supported on the bottom plate 112. The bottom plate 112 may be first mounted at the bottom of the image sensor component 16, and then the outer frame 111 is fixedly connected to the bottom plate 112.

It should be noted that, after the first driving component 14 and the second driving component 15 are assembled on the fastening bracket 12, performance of the first driving component 14 and the second driving component 15 may be tested. In this way, accuracy of overall driving performance testing of the first driving component 14 and the second driving component 15 can be improved, and image stabilization performance of the camera module 1 can be accurately tested, thereby improving reliability of the camera module 1. After driving performance testing of the first driving component 14 and the second driving component 15 are completed, the image sensor component 16 is assembled on the first driving component 14. The image sensor component 16 may be separately processed and manufactured, so that production costs of the image sensor component 16 can be reduced.

In the descriptions of the embodiments of this application, it should be noted that, unless otherwise explicitly specified and defined, the terms "mount", "communicate", and "connect" should be understood in a broadest sense, for example, may be a fixed connection, an indirect connection by using an intermediate medium, or a connection between insides of two elements or an interaction relationship between the two elements. A person of ordinary skill in the art may understand specific meanings of the foregoing terms in the embodiments of this application based on a specific situation.

The terms "first", "second", "third", "fourth", and the like (if existent) in the specification, claims, and accompanying drawings of the embodiments of this application are used to distinguish between similar objects, but are not necessarily used to describe a particular order or sequence.

What is claimed is:

1. A camera module, comprising a casing, a fastening bracket, a lens assembly, a first driving component, a second driving component, and an image sensor component, the lens assembly is partially accommodated in the casing, the fastening bracket is disposed in the casing, the image sensor component is located at the bottom of the casing, the fastening bracket comprises a first fastening part and a second fastening part, the first fastening part is sleeved outside the lens assembly, the second fastening part is connected to a side that is of the first fastening part and that faces the bottom of the casing, the second fastening part is supported on an inner bottom wall of the casing, and at least one magnetic component is fastened to an inner edge of the first fastening part; and the first driving component is located on the side that is of the first fastening part and that faces the bottom of the casing, one side surface of the first driving component faces one part of the magnetic component, the other side surface of the first driving component is connected to the image sensor component, the magnetic component is configured to drive the first driving component to move, the second driving component is sleeved on an outer wall of the lens assembly, the second driving component faces the other part of the magnetic component, and the magnetic component is configured to drive the second driving component to move;

the first driving component comprises a support plate, a ball is disposed between the fastening bracket and the support plate, and the fastening bracket and the support plate are in contact with each other by using the ball.

2. The camera module according to claim 1, wherein the second fastening part comprises a plurality of support parts disposed at intervals, and the first driving component and the image sensor component are located in space enclosed by the plurality of support parts.

3. The camera module according to claim 1, wherein at least two magnetic components are fastened to the inner edge of the first fastening part, and the two magnetic components are respectively disposed on two opposite sides of the first fastening part.

4. The camera module according to claim 1, wherein the magnetic component comprises a first magnetic member and a second magnetic member, the first magnetic member faces the first driving component and drives the first driving component to move, and the second magnetic member faces the second driving component and drives the second driving component to move.

5. The camera module according to claim 4, wherein the magnetic component further comprises a magnetoconductive member fastened to the first fastening part, the magnetoconductive member comprises a first magnetoconductive part and a second magnetoconductive part, the first magnetoconductive part faces the first driving component, a surface of the first magnetic member is attached to a surface of the first magnetoconductive part, the second magnetoconductive part faces the second driving component, and a surface of the second magnetic member is attached to a surface of the second magnetoconductive part; and the first magnetoconductive part and the second magnetoconductive part have opposite magnetism, the first magnetic member and the first magnetoconductive part have opposite magnetism, and the second magnetic member and the second magnetoconductive part have opposite magnetism.

6. The camera module according to claim 1, wherein the first driving component further comprises at least one first driving coil, the first driving coil is disposed on a side surface that is of the support plate and that faces the magnetic component, and the first driving coil is opposite to the magnetic component.

7. The camera module according to claim 6, wherein at least one first limiting part is disposed on the first fastening part, at least one second limiting part is disposed on a side that is of the support plate and that faces the first fastening part, the second limiting part is opposite to the first limiting part, the ball is disposed between the first limiting part and the second limiting part.

8. The camera module according to claim 7, wherein at least two first limiting parts are disposed on the first fastening part, the two first limiting parts are opposite, at least two second limiting parts are disposed on the support plate, and each second limiting part corresponds to each first limiting part.

9. The camera module according to claim 7, wherein a limiting recess is disposed on one of the first limiting part and the second limiting part, and the ball moves within the limiting recess.

10. The camera module according to claim 6, wherein the support plate is a magnetoconductive plate.

11. The camera module according to claim 1, wherein the second driving component comprises a support base and a second driving coil, the support base is sleeved on the outer wall of the lens assembly, and the second driving coil is sleeved on an outer wall of the support base.

12. The camera module according to claim 1, wherein the image sensor component comprises an image sensor, there is a gap between a heat dissipation surface of the image sensor and the inner bottom wall of the casing, and the gap is filled with thermally conductive liquid.

13. The camera module according to claim 12, wherein an annular sealing plate is affixed to the inner bottom wall of the casing, and the thermally conductive liquid is located in an area enclosed by the annular sealing plate.

14. The camera module according to claim 13, wherein there is a gap between the annular sealing plate and the image sensor.

15. The camera module according to claim 13, wherein a plurality of sealing holes are disposed at intervals on the annular sealing plate, or a surface of the annular sealing plate is an uneven corrugated surface.

16. The camera module according to claim 13, wherein a plurality of strip-shaped grooves are disposed at intervals on the annular sealing plate, and the strip-shaped grooves extend in a direction of a contour line of the annular sealing plate; and a plurality of rows of strip-shaped grooves are disposed from an inner edge to an outer edge of the annular sealing plate, and strip-shaped grooves in different rows are staggered.

17. The camera module according to claim 12, wherein the image sensor component further comprises a flexible electrical connecting piece, one end of the flexible electrical connecting piece is connected to the image sensor, and the other end of the flexible electrical connecting piece is configured to be connected to an external circuit.

18. The camera module according to claim 17, wherein the flexible electrical connecting piece comprises a connecting part, a movable cantilever, and a fastening part, the connecting part is connected to the image sensor, the fastening part is connected to the external circuit, and the movable cantilever is located between the connecting part and the fastening part; and the movable cantilever surrounds the image sensor at least half a circle.

19. An assembly method for a camera module, used to assemble the camera module according to claim 1, and comprising:

providing a lens assembly, and sleeving a second driving component on an outer wall of the lens assembly;

providing a fastening bracket, wherein the fastening bracket comprises a first fastening part and a second fastening part, and the second fastening part is connected to a bottom surface of the first fastening part;

fastening at least one magnetic component to an inner edge of the first fastening part;

sleeving, outside the lens assembly, the fastening bracket to which the magnetic component is fastened, wherein the second driving component faces one part of the magnetic component;

providing a first driving component, and connecting one side surface of the first driving component to the fastening bracket, wherein the first driving component faces the other part of the magnetic component;

providing an image sensor component, and fastening the image sensor component to the other side surface of the first driving component; and sleeving a casing outside the fastening bracket.

20. An electronic device, comprising at least one camera module, the camera module comprises a casing, a fastening bracket, a lens assembly, a first driving component, a second driving component, and an image sensor component, the lens assembly is partially accommodated in the casing, the fastening bracket is disposed in the casing, the image sensor component is located at the bottom of the casing, the fastening bracket comprises a first fastening part and a second fastening part, the first fastening part is sleeved outside the lens assembly, the second fastening part is connected to a side that is of the first fastening part and that faces the bottom of the casing, the second fastening part is supported on an inner bottom wall of the casing, and at least one magnetic component is fastened to an inner edge of the first fastening part; and the first driving component is located on the side that is of the first fastening part and that faces the bottom of the casing, one side surface of the first driving component faces one part of the magnetic component, the other side surface of the first driving component is connected to the image sensor component, the magnetic component is configured to drive the first driving component to move, the second driving component is sleeved on an outer wall of the lens assembly, the second driving component faces the other part of the magnetic component, and the magnetic component is configured to drive the second driving component to move;

the first driving component comprises a support plate, a ball is disposed between the fastening bracket and the support plate, and the fastening bracket and the support plate are in contact with each other by using the ball.

* * * * *